United States Patent
D'Amora et al.

(10) Patent No.: US 9,461,916 B2
(45) Date of Patent: Oct. 4, 2016

(54) SMART DELIVERY OF LI DATA IN EMERGENCY CONDITIONS

(75) Inventors: Paolo D'Amora, Gragnano (IT); Raffaele De Santis, Mercato San Severino (IT); Lorenzo Fiorillo, San Nicola la Strada (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 99 days.

(21) Appl. No.: 14/387,352

(22) PCT Filed: Mar. 26, 2012

(86) PCT No.: PCT/SE2012/050334
§ 371 (c)(1),
(2), (4) Date: Sep. 23, 2014

(87) PCT Pub. No.: WO2013/147654
PCT Pub. Date: Oct. 3, 2013

(65) Prior Publication Data
US 2015/0049613 A1    Feb. 19, 2015

(51) Int. Cl.
*H04L 12/801* (2013.01)
*H04L 12/24* (2006.01)
(Continued)

(52) U.S. Cl.
CPC ............ *H04L 47/12* (2013.01); *H04L 12/24* (2013.01); *H04L 43/0882* (2013.01); *H04L 43/16* (2013.01); *H04L 47/11* (2013.01);
(Continued)

(58) Field of Classification Search
CPC ......... H04L 47/12; H04L 47/11; H04L 12/24
See application file for complete search history.

(56) References Cited

U.S. PATENT DOCUMENTS

2003/0115355 A1* 6/2003 Cometto ............... H04L 47/12
709/234
2004/0090916 A1* 5/2004 Hosein ............... H04L 12/5695
370/235

(Continued)

FOREIGN PATENT DOCUMENTS

| EP | 2 157 804 A1 | 2/2010 |
|---|---|---|
| EP | 2157804 A1 | 2/2010 |
| WO | WO 2008082329 A1 | 7/2008 |

OTHER PUBLICATIONS

Communication with Supplementary European Search Report, Application No. EP 12872758.3, Nov. 11, 2015.
(Continued)

*Primary Examiner* — Albert T Chou
(74) *Attorney, Agent, or Firm* — Myers Bigel & Sibley, P.A.

(57) ABSTRACT

Methods and arrangements are provided for maintaining a wanted Quality of Service transmission level of Lawful Interception (LI) payload data to a Law Enforcement Agency (LEA) via an HI3 interface in a LI system. The data is acquired from an intercepted IP packet flow and belongs to one or more target identities using a specific Internet communications service. The method, which is performed by the arrangement, includes monitoring the state of congestion of IP packets in the HI3 interface in relation to a first threshold level T1 and a second threshold level T2. The first threshold level T1 corresponds to a lower level of congestion than the second threshold level T2. The transmission of LI payload data is controlled based on the monitoring and a priority classification assigned to the LI payload data to be transmitted.

20 Claims, 14 Drawing Sheets

(51) Int. Cl.
*H04L 29/06* (2006.01)
*H04L 12/26* (2006.01)

(52) U.S. Cl.
CPC .......... *H04L 63/306* (2013.01); *H04L 43/028* (2013.01); *H04L 47/29* (2013.01)

(56) References Cited

U.S. PATENT DOCUMENTS

| | | | | |
|---|---|---|---|---|
| 2004/0111541 | A1* | 6/2004 | Meyer | H04L 47/10 710/52 |
| 2009/0117895 | A1 | 5/2009 | McGuffin | |
| 2010/0086119 | A1* | 4/2010 | De Luca | H04M 3/2281 379/213.01 |
| 2012/0250584 | A1* | 10/2012 | Jayaraman | H04L 63/304 370/259 |

OTHER PUBLICATIONS

ETSI, Technical Specification—"Lawful Interception (LI); Handover Interface and Service-Specific Details (SSD) for IP delivery; Part 1: Handover specification for IP delivery", ETSI TS 102 232-1 V2.8.1 (Oct. 2011), 52 pp.

International Search Report for International Application No. PCT/SE2012/050334 mailed Apr. 10, 2013, 3 pages.

Written Opinion of the International Searching Authority for International Application No. PCT/SE2012/050334 mailed Apr. 10, 2013, 7 pages.

3GPP TS 33.106 V11.1.1 (Nov. 2011); $3^{rd}$ Generation Partnership Project; Technical Specification Group Services and System Aspects; 3G security; Lawful Interception requirements (Release 11); 650 Route des Lucioles, Sophia Antipolis, Valbonne, France;17 pages.

3GPP TS 33.107 V11.2.0 (Jun. 2012) $3^{rd}$ Generation Partnership Project; Technical Specification Group Services and System Aspects; 3G security; Lawful interception architecture and functions (Release 11); 650 Route des Lucioles, Sophia Antipolis, Valbonne, France;135 pages.

3GPP TS 33.108 V11.2.0 (Mar. 2012); $3^{rd}$ Generation Partnership Project; Technical Specification Group Services and System Aspects; 3G security; Handover interface for Lawful Interception (LI) (Release 11); 650 Route des Lucioles, Sophia Antipolis, Valbonne, France;194 pages.

\* cited by examiner

SMART DELIVERY OF LI DATA IN EMERGENCY CONDITIONS

CROSS REFERENCE TO RELATED APPLICATION

This application is a 35 U.S.C. §371 national stage application of PCT International Application No. PCT/SE2012/050334, filed on 26 Mar. 2012, the disclosure and content of which is incorporated by reference herein in its entirety. The above-referenced PCT International Application was published in the English language as International Publication No. WO 2013/147654 A1 on 3 Oct. 2013.

TECHNICAL FIELD

The present disclosure is related to Lawful Interception. More particularly, the disclosure presents a method and an arrangement for maintaining a wanted Quality of Service transmission level of Lawful Interception (LI) payload data to a Law Enforcement Agency (LEA) via an HI3 interface in a LI system.

BACKGROUND

Ensuring QoS, i.e. quality of service, in a multiservice IP network, is a well-known challenge often related to IP packets loss due to the problem of network congestion.

In the Lawful Interception scenario, generally speaking it is essential to guarantee the delivery of intercepted payload as Internet Protocol, IP, packets with absolute integrity.

FIG. 1 is a block diagram of an exemplary Lawful Interception, LI, system and network 10 according to prior art. Said system and network comprises a number of entities. The exemplary LI system comprises a Law Enforcement Management Function, LEMF, 12 for requesting LI services of the LI system and collecting the intercepted information of Intercepting Control Elements, ICEs, in the system. The system shall provide access to the intercepted Content of Communications, CC, and Intercept Related Information, IRI, of a target and services related to the target on behalf of one or more Law Enforcement Agencies, LEAs. An intercept request, also denoted Request for LI activation, is sent through a first Handover Interface, HI1, located between the Law Enforcement Management Function 12 and an Intercept Mediation and Delivery Unit, IMDU, 14 comprising a Mediation Function, MF, 16 and an Administration Function, ADMF, 18. Said Mediation Function 16 and Administration Function 18 generates based on said received request a warrant comprising said one or more target identities, and sends said warrant towards an Intercept Access Point, IAP, comprising an Intercepting Control Element, ICE, 20 via an interface denoted X1_1. Requests are also sent from the ADMF to a Mediation Function MF3 in the DF3 on a Handover Interface X1_3. The requests sent on X1_3 are used for activation of Communication Content, and to specify detailed handling options for intercepted CC.

The ICE 20 may be connected to a node of a network, e.g. the Internet, a 3 GMS (third generation Mobile Communications System), etc., from which it intercepts said Content of Communications and Intercept Related Information of a mobile target. Said CC and IRI are network related data. As reference to the standard model, see references [1], [2] and [3], the content of communication is Intercepted in the ICE network node and it is based upon duplication of target communication payload without modification. In reference [3], the interfaces HI1 and HI2 is specified in more detail.

The ICE sends IRI raw data via an interface X2 to a Delivery Function for IRI reporting, DF2, 24 and a Mediation Function of IRI, MF2, 22 that generates and delivers to a collection functionality a standardized IRI report based on the received IRI report. Said standardized IRI report is sent over a standardized interface HI2 to the LEMF 12. The ICE 20 also sends CC raw data via an interface X3 to a Delivery Function for CC reporting, DF3, 26 and a Mediation Function IRI, MF3, 28 which generates a delivers to a collection functionality a standardized CC report based on the received CC report. Said standardized CC report is sent over a standardized Interface HI3 to the requesting LEMF 12.

The HI2 and HI3-interfaces represent the interfaces between the LEA and two delivery functions. The delivery functions are used:
  to distribute the Intercept Related Information (IRI) to the relevant LEA(s) via HI2;
  to distribute the Content of Communication (CC) to the relevant LEA(s) via HI3.

Together with the delivery functions it is used to hide from the third generation (3G) Intercepting Control Elements ICE(s) that there might be multiple activations by different Lawful Enforcement Agencies on the same target.

FIG. 2 is a more schematic Illustration of a Lawful Interception, LI, system and network than the system and network 10 illustrated in FIG. 1.

An Intercept Access Point, IAP, comprises an Intercepting Control Element, ICE, 20, which is a device within the network that is used for intercepting lawfully authorized Intercept Information sent between a target using some kind of user equipment 40-46 (e.g. mobile phone terminal 40, television set 42, laptop or Personal Computer 44, smartphone 46, etc.) and another user equipment 40-46 or an application server 48, e.g. an Internet TV (IPTV) server, Internet (FTP—File Transfer Protocol) server, etc. in a service center. It may be an existing device that has intercept capability or it could be a special device that is provided for that purpose.

The high bandwidth available in the modern broadband networks puts challenging capacity requirements on the LI Infrastructure and equipment, for both the operator and agency. When the available bandwidth is limited on delivery side, high peaks of traffic on the Incoming side of a DF3 system (see FIG. 3) can cause temporary conditions on the delivery side in which the transmission links can encounter network congestion, which may result into IP packets loss in case of high bandwidth consuming Content of Communication like for instance, IPTV or broadcasting data is to be delivered to a monitoring function.

When the network congestion conditions persist, IP packets loss can take place systematically, with huge degradation in the quality of the provided interception activity. If a Mediation Device, MD, 60 is configured to receive the data from the IAP/ICE 20 and package it in the correct format (which may vary from country to country) and deliver it to the LEA/MC, Law Enforcement Agency/Monitoring center, 80 a congestion problem in the HI3 interface causes IP packet dropping in the MD 60.

One of the measures, requested to the operators as Regulatory Requirements in many countries, is to temporarily buffer the result of interception in the operator domain while reestablishing the delivery of the buffered IP packets when the congestion or link down condition is no longer present. That feature is referred as "Payload Buffering" and a disk buffer 50 may be used.

Although the "Payload Buffering" function is a good solution for emergency conditions like link to the agency down or long congestion status condition due to high peaks of intercepted payload, there are at least three open Issues to be solved:

Real Time Issue: At the prior art, DF3 (26 in FIG. 1) sends IP packets on the HI3 Interface without considering the state of network congestion and without analyzing the priority of processed traffic. Network congestion can involve the problem of the variation of packet delay. That problem is closely associated with quality of service; as example for multimedia conversational services that are real-time characterized, the effect seen could be poor quality in the monitored conversation coming from the jitter.

High Priority LI data: High priority LI data cannot be delivered in real time due to the activated payload buffering functionality, said data will not be available to an agency until the whole buffer 50 is delivered. The contents of any conversational communication activities or the contents of communications related to subscribers that are very sensitive for LEA Investigations are explicitly considered as high priority LI data.

Snowball effect issue: At restore of the normal conditions, the delivery function shall take care of both the buffered LI data and of the real time "fresh" data arriving from the nodes and that situation might potentially trigger a snowball effect with possible loss of data and subsequent delay of the real-time delivery.

SUMMARY

This disclosure relates to Lawful Interception dealing with the delivery of LI data for high bandwidth consuming services and in specific critical conditions due to limited connectivity on the LEA delivery side, e.g. the delivery links are low in bandwidth or even Interrupted.

The object of the following embodiments and aspects is to solve at least one of said above listed Issues: Real Time issue, High Priority LI data and/or Snowball effect issue.

For achieving said object, it is provided a method and embodiments of said method for maintaining a wanted Quality of Service transmission level of Lawful Interception payload data to a Law Enforcement Agency via an HI3 interface in a Lawful Interception system. The Lawful Interception payload data is acquired from an intercepted Internet Protocol packet flow and belongs to one or more target identities using a specific Internet communications service. The method comprises:

Monitoring the state of congestion of IP packets in the HI3 Interface in relation to a first threshold level T1 and a second threshold level T2, wherein the first threshold level T1 corresponds to a lower level of congestion than the second threshold level T2; and Controlling the transmission of LI payload data based on said monitoring and a priority classification assigned to the LI payload data to be transmitted.

A number of embodiments of said method are further provided and described.

According to another aspect for achieving said object, it is herein provided an arrangement and embodiments of said arrangement for maintaining a wanted Quality of Service transmission level of Lawful Interception payload data to a Law Enforcement Agency via an HI3 interface of a LI system. The Lawful Interception payload data is acquired from an intercepted Internet Protocol packet flow and belongs to one or more target identities using a specific Internet service. The arrangement comprises a delivery functionality block DF3, which comprises a monitoring means configured to monitor the state of congestion of IP packets in the HI3 interface in relation to a first threshold level T1 and a second threshold level T2, wherein the first threshold level T1 corresponds to a lower level of congestion than the second threshold level T2. The arrangement further comprises a transmission controller configured to control the transmission of Lawful Interception payload data to the Law Enforcement Agency via the HI3 interface based on said monitoring and a priority classification assigned to the Lawful Interception payload data to be transmitted.

A number of embodiments of said method are further provided and described.

The described aspects and embodiments described herein have a number of advantages.

One advantage of the above descried aspects and embodiments is that the operators can provide an automatic solution for handling situation where connectivity issues prevent the real time delivery and an agency claims the immediate delivery of urgent LI data. It avoids ad hoc, unsecure, unplanned, operations like manual delivery to the agency via e-mail, manual delivery via DVD, memory devices which is usually requested to the operator in such cases.

Another advantage is the reduction of conditions of network congestion on delivery side by reducing the amount of data to deliver when the congestion in network increases. This mechanism delays the triggering of the "Payload Buffering" by limiting its activation only to situations of permanent high traffic conditions on incoming side of DF3.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. In order to provide a thorough understanding of the present invention. However, it will be apparent to one skilled in the art that the present Invention may be practiced in other embodiments that depart from these specific details. In other instances, detailed descriptions of well known methods, devices, and circuits are omitted so as not to obscure the description of the present invention with unnecessary detail.

Figure 3:
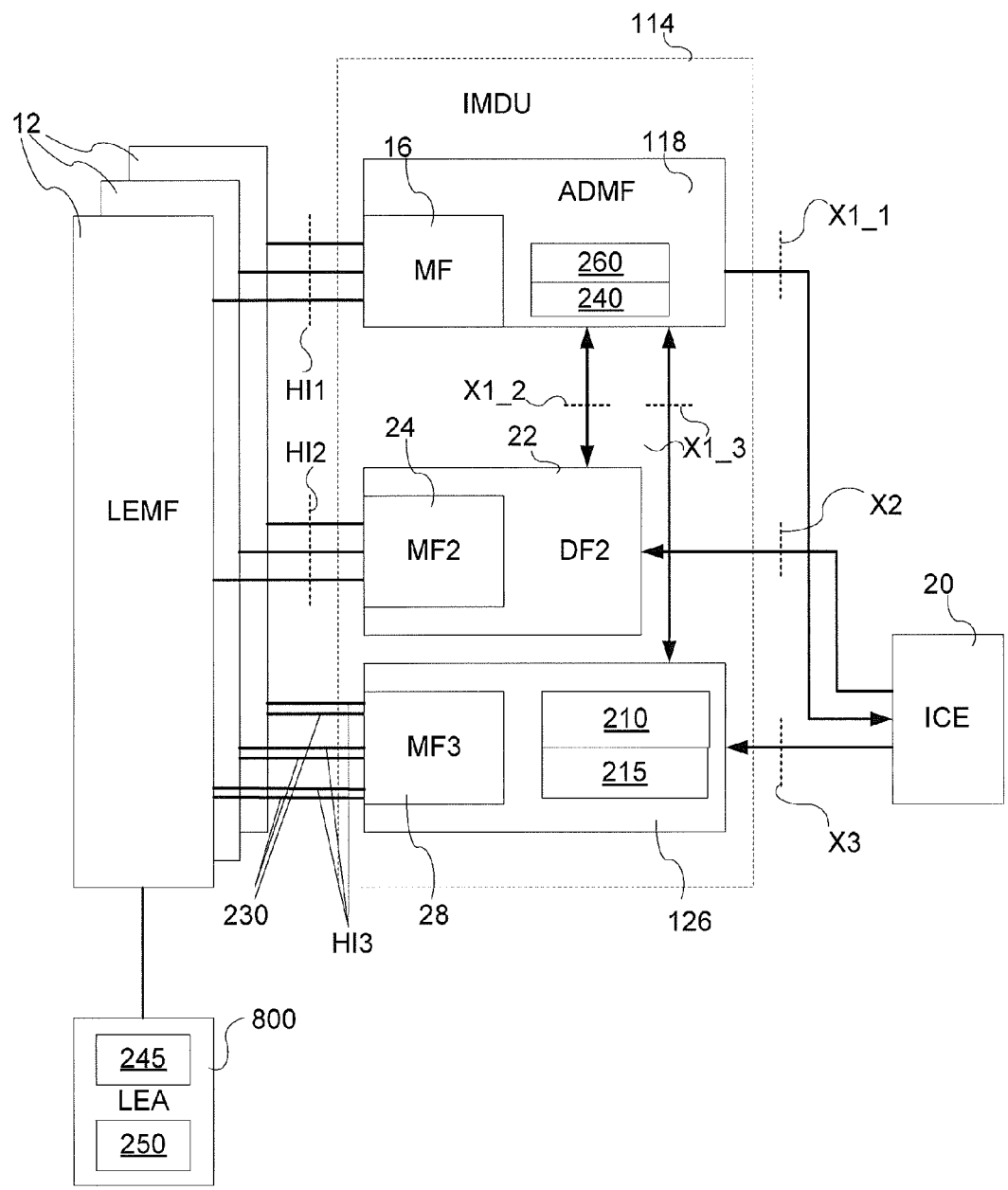
FIG. 3 is a block diagram illustrating an embodiment of a LI system comprising an arrangement according to one aspect of the present invention.

FIG. 3 is a block diagram illustrating an embodiment of a LI system 100 comprising an arrangement 114 according to one aspect of the present invention.

This embodiment of the LI system 100 comprises a Law Enforcement Management Function, LEMF, 12 for requesting LI services of the LI system and collecting the intercepted information of Intercepting Control Elements, ICEs, 20 in the system. The system shall provide access to the intercepted Content of Communications, CC, and Intercept Related Information, IRI, of a target and services related to the target on behalf of one or more Law Enforcement Agencies, LEAs, 800. An intercept request, also denoted Request for LI activation, is sent through a first Handover Interface, HI1, located between the Law Enforcement Management Function 12 and an Intercept Mediation and Delivery Unit, IMDU, 114 comprising a Mediation Function, MF, 16 and an Administration Function, ADMF, 118. Said Mediation Function 16 and Administration Function 118 generates based on said received request a warrant comprising said one or more target identities, and sends said warrant towards an Intercept Access Point, IAP, comprising an Intercepting Control Element, ICE, 20 via an interface denoted X1_1. Requests are also sent from the ADMF to a Mediation Function MF3 in the DF3 on a Handover Interface X1_3. The requests sent on X1_3 are used for activation of Communication Content, and to specify detailed handling options for intercepted CC.

The ICE 20 may be connected to a node of a network, e.g. the Internet, a 3 GMS (third generation Mobile Communications System), etc., from which it Intercepts said Content of Communications and Intercept Related Information of a mobile target. Said CC and IRI are network related data. As reference to the standard model, see references [1], [2] and [3], the content of communication is intercepted in the ICE network node and it is based upon duplication of target communication payload without modification. In reference [3], the interfaces HI1 and HI2 is specified in more detail. The ICE sends IRI raw data via an interface X2 to a Delivery Function for IRI reporting, DF2, 24 and a Mediation Function of IRI, MF2, 22 that generates and delivers to a collection functionality a standardized IRI report based on the received IRI report. Said standardized IRI report is sent over a standardized interface HI2 to the LEMF 12. The ICE 20 also sends CC raw data via an Interface X3 to a Delivery Function for CC reporting, DF3, 126 and a Mediation Function of IRI, MF3, 28 which generates and delivers to a collection functionality a standardized CC report based on the received CC report. Said standardized CC report is sent over a standardized interface HI3 to the requesting LEMF 12.

The HI2 and HI3-interfaces represent the interfaces between the LEA 800 and two delivery functions. The delivery functions are used:
 to distribute the Intercept Related Information (IRI) to the relevant LEA(s) via HI2;
 to distribute the Content of Communication (CC) to the relevant LEA(s) via HI3.

Figure 1:
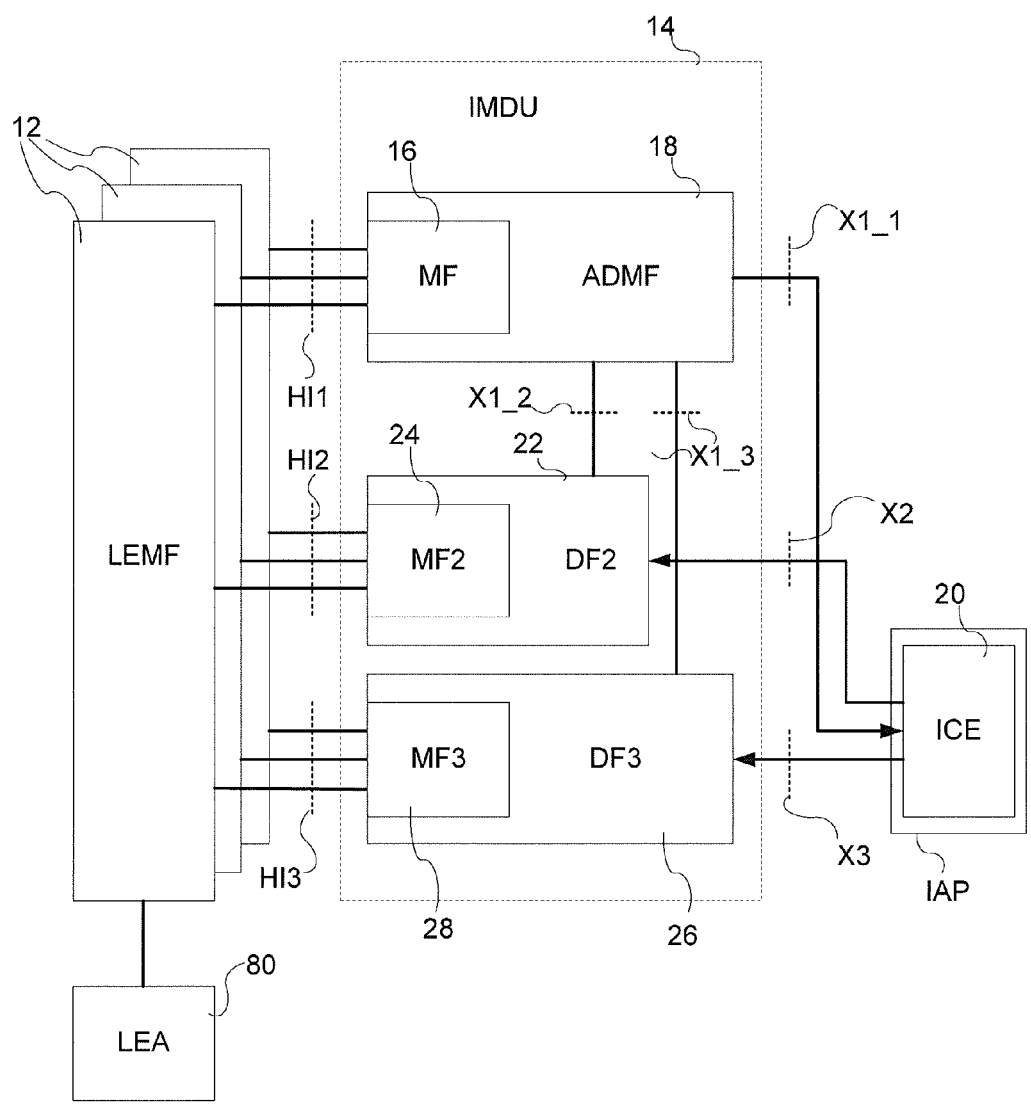
FIG. 1 is a block diagram of an exemplary Lawful Interception, LI, system and network according to prior art.

The LI system 100 differs from the prior art system 10 according to FIG. 1 in that the Intercept Mediation and Delivery Unit, IMDU, arrangement 114 is modified for accomplishing at least one of the objects listed in the Summary section of the present specification. The modified IMDU 114 comprises a modified Administration Function, ADMF, 118, and a modified delivery functionality block DF3 126. According to the illustrated embodiment, DF3 comprises a monitoring means 210 and a transmission controller 215. The new ADMF 118 is provided with an alert entity 240. The monitoring means 210 is configured to monitor the state of congestion of IP packets in the HI3 Interface in relation to a first threshold level T1 and a second threshold level T2, wherein the first threshold level T1 corresponds to a lower level of congestion than the second threshold level T2. The transmission controller 215 is configured to control the transmission of LI payload data to the LEA via the HI3 Interface based on said monitoring and a priority classification assigned to the LI payload data to be transmitted. Further, the LI system comprises a LEA 800, which is provided with a message notification receiver 245 and a warrant priority setting functionality means 250. Said means 250 provide a user of the system to set a priority on the warrant, e.g. high or low. The marking of a warrant may be performed by a user or LEA 800, who is able to set the priority of a warrant by means of the described warrant priority setting functionality means 250 which is configured to communicate with a warrant priority marking means 260 in the ADMF 118. Said marking means 260 is designed to mark the warrant with a high or low priority label.

A warrant is marked with the sent priority. When the marking means 260 in the ADMF 118 receives a request, it is configured to read the priority for the warrant, if the warrant is marked with a priority, and to forward said information to the DF3 126 via the interface X13.

The message notification receiver 245 is configured to receive from the alert entity 240 of the ADMF 114 a message, e.g. warning message or an alarm message. When the message notification receiver 245 receives such an alert or notification message, the receiver 245 alerts the user or LEA 800 about the current congestion state in the LI system.

Figure 4:
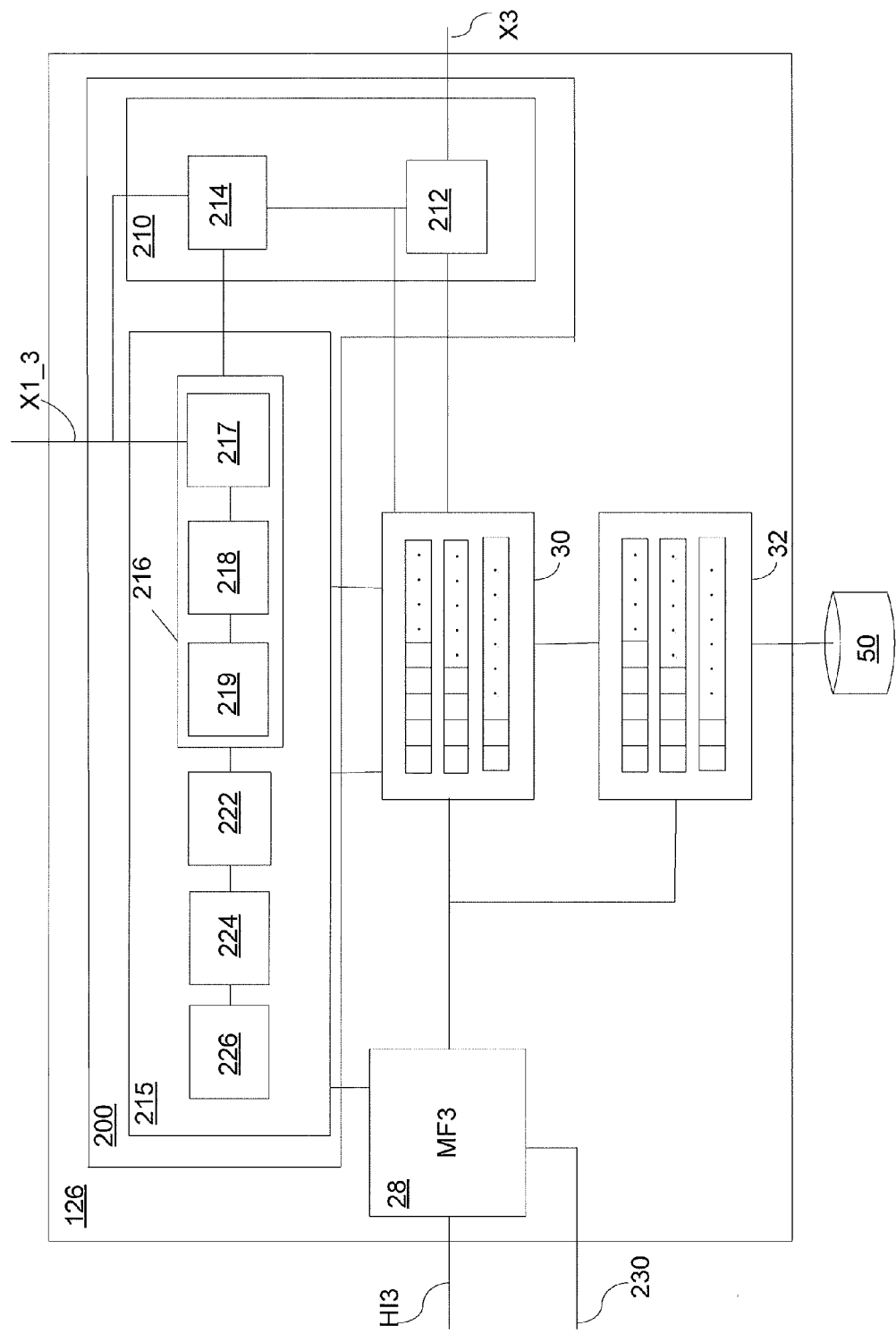
FIG. 4 is a block diagram Illustrating an embodiment of a delivery functionality block DF3 in an arrangement according to the present invention.

FIG. 4 is a block diagram illustrating an embodiment of a delivery functionality block DF3 126 in an arrangement according to the present invention. According to the illustrated embodiment, DF3 comprises a mediation function block MF3 28, a buffering queue block 30, a temporary buffer store 32, even here denoted as low priority queue buffer, and a delivery functionality block control 200, which involves monitoring means 210 and a transmission controller 215. A buffer disk 50 is also connected or connectable to block DF3 126.

The delivery functionality block control 200 according to different embodiments descried herein may be Implemented in digital electronically circuitry, or in computer hardware, firmware, software, or in combinations of them. Embodiments of the different aspects of the Invention may be implemented in a computer program product tangibly embodied in a machine readable storage device for execution by a programmable processor; and method steps of the invention may be performed by a programmable processor executing a program of instructions to perform functions of the invention by operating on input data and generating output.

The different described aspects and embodiments of the invention may advantageously be implemented in one or more computer programs that are executable on a programmable system including at least one programmable processor coupled to receive data and instructions from, and to transmit data and instructions to, a data storage system, at least one Input device, and at least one output device. Each computer program may be implemented in a high-level procedural object-oriented programming language or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or Incorporated in, specially—designed ASICs (Application Specific Integrated Circuits).

The monitoring means 210 may be considered as a block of means or sub-blocks. The block receives data Content of Communications, CC, from an ICE 20 via an interface X3. The monitoring means 210 comprises means for checking data packets 212 and a comparator 214.

The transmission controller 215 comprises an IP packet classification functionality block 216, which Involves a warrant classifier 217, a deep packet Inspection DPI unit 218, and a communication classifier 219, a transmit controller 222, a temporary buffering function control 224 and Payload buffering function control 226.

The delivery functionality block DF3 126 is connected to the LEMF 12 via the interface HI3 and an emergency route, or dedicated interface 230. Said dedicated interface 230 is a new feature provided to LI system. Said dedicated interface and other new features will be described in more detail in the following of the present description of different embodiments.

The invention addresses problems arising when the delivery of LI data for high bandwidth consuming services and in specific critical conditions due to limited connectivity on the LEA delivery side occur, e.g. the delivery links are low in bandwidth or even Interrupted. One object of some embodiments of the arrangement 114 is to maintain a wanted Quality of Service, QoS, transmission level of Lawful Interception, LI, payload data to a Law Enforcement Agency, LEA, 800 via an HI3 interface of the LI system. The LI payload data may be acquired from an intercepted Internet Protocol, IP, packet flow and belongs to one or more target identities using a specific Internet service. The monitoring means 210 comprises a comparator 214, which s configured to monitor the state of congestion of IP packets in the HI3 interface in relation to a first threshold level T1 and a second threshold level T2, wherein the first threshold level T1 corresponds to a lower level of congestion than the second threshold level T2. State of congestion could be understood as the level of congestion or rather the level until congestion in the system is reached. The state or level of congestion could be e.g. a quota or percentage of full congestion. The arrangement 114 comprises a transmission controller 215 configured to control the transmission of LI payload data to the LEA via the HI3 interface based on said monitoring and a priority classification assigned to the LI payload data to be transmitted.

The transmission controller 215 may comprise a transmit controller 222 which can reduce or increase the amount of LI payload data transmitted over the HI3 interface. As an example, the transmit controller 222 may reduce the amount of LI payload data transmitted over the HI3 Interface by limiting the transmission of LI payload data classified as low priority LI payload data, if the level of congestion exceeds the first threshold value T1 but not the second threshold value T2. In this warning state, the comparator 214 alerts the temporary buffering control 224 that controls the transmit controller 222 to limit the transmission of LI payload data classified as low priority LI payload data. The temporary buffering control 224 may also be configured to signal via the interface X1_3 to the alert entity 240, which is configured to alert the Law Enforcement Agency 800 by sending a warning message for informing the LEA 800 that temporary buffering of LI payload data has started.

The transmit controller 222 may also reduce the amount of LI payload data transmitted over the HI3 interface by limiting the transmission of LI payload data classified as both low and high priority LI payload data, if the level of congestion exceeds the second threshold value T2. In this alarm state, the comparator 214 alerts the payload buffering control 226 that controls the transmit controller 222 to limit the transmission of all LI payload data. The payload buffering control 226 may also be configured to signal via the interface X1_3 to the alert entity 240, which is configured to alert the Law Enforcement Agency 800 by sending an alarm notification message, i.e. alarm message, for informing the LEA 800 that payload buffering of LI payload data has started.

The transmission controller 215 may also comprise the IP packet classification functionality block 216 that comprises a warrant classifier means 217 and a communication classifier 219. The warrant classifier means 217 is configured to identify high priority LI payload data and low priority LI payload data depending on if the LI payload data is associated to high priority warrants, or not. The warrant classifier means 217 is therefore connected to the warrant priority marking means 260 in the ADMF 118 via the interface X1_3. A copy of a generated warrant or information regarding said may be sent over said interface from the warrant priority marking means 260 to the warrant classifier means 217, where it may be registered and used when contents of communication CC is received corresponding to said warrant. The communications classifier 219 is configured to identify high priority LI payload data and low priority LI payload data depending on if the LI payload data belongs to high priority communications services, or not. The deep packet inspection DPI unit 218 reads the header content of the received IP packets and enables the communications classifier 219 to determine which communication service kind of service the received IP packets are related. The classifier 219 may use a list or table wherein each service related to a priority class, e.g. high or low. Table 1 example of Priority Communication List:

TABLE 1

Priority Communication List

| Application/communication service | Priority |
|---|---|
| SIP, MSN Messenger, Skype | High |
| SSH | High |
| FTP, SMTP | Low |

According to some embodiments of the invention, the warrant classifier means 217 may be adapted to handle and identify undelivered LI payload data as high priority LI payload data if said undelivered LI payload data is associated to a high priority warrant, regardless of the priority of the communications service.

High priority LI data is defined as the combination of High Priority Communications and High Priority Warrants, where:

High Priority Communications

The contents of any conversational communication activities done by the target are classified as high priority communications. It is assumed that the list of High Priority communications s predefined in the system.

High Priority Warrants

It is assumed that at warrant creation time it is possible to mark the warrant with a High Priority label. This means that all the communication activities done by the target of that warrant are relevant for the LEA and shall be handled with High Priority. The marking of a warrant may be performed by a user or LEA 800, who is able to set the priority of a warrant by means of the described warrant priority setting functionality means 250 which is configured to communicate with the warrant priority marking means 260. Said marking means 260 is designed to mark the warrant with a high or low priority label.

As understood, the user or LEA is free to decide if the priority of a warrant or communication is high or low.

The delivery functionality block DF3 126 comprises one or more delivery queues 30 for queuing undelivered LI payload data. The monitoring means 210 comprises a comparator 214 configured to compare the first threshold level T1 and a second threshold level T2 to the level of undelivered LI payload data in said one or more delivery queues 30. Said level of undelivered LI payload data in said one or more delivery queues 30 is used as a measure of the state, or level, of congestion of IP packets in the HI3 interface and the comparator 214 is connected to said buffers and is configured to check the current state of level of buffered IP packets. The means for checking data packets 212 is an optional receiving unit. Said means 212 checks and reads the information in the headers of the received IP packets, which is delivered to and used by the delivery functionality block control 200 and its monitoring means 210 and transmission controller 215 for handling the IP packets property and to have updated information about the received but undelivered LI payload data that is stored in the buffers 30, 32 and payload buffering disk 50.

A DF3 function uses a set of delivery queues where LI data are ready to be delivered over the link to a LEA 800 and/or Monitoring Center. The current invention defines a new threshold T1 in addition to the already existing T2.

T1: Warning, medium level of congestion—the level of the delivery queues is above the normal situation. The Payload Buffering function is not yet activated.

T2: Alarm, high level of congestion—the delivery queues are full and the delivery functionality Is severely affected. The Payload Buffering function is activated.

When the T1 threshold is reached, the idea is to start a "Smart Delivery" mechanism: the DF3 delivers only IP packets belonging to High priority LI data and temporary keep in a low priority queue 32 the remaining data. Such measure reduces the amount of LI data to deliver, so reducing the congestion problem at delivery side while optimizing the bandwidth usage.

One benefit is that the number of triggering of the "Payload Buffering" is reduced and delayed as the threshold T2 is not exceeded as often due to occasional high peaks of traffic.

The transmission controller 215 by means of a transmit controller 222 reduces the amount of LI payload data transmitted over the HI3 interface by activating a Payload buffering function 226 and thereby limiting the transmission of LI payload data classified as high priority LI payload data, if the level of undelivered LI payload data in one or more delivery queues 30 exceeds the second threshold value. The transmission controller 215 is adapted to prevent transmission of all LI payload data over the HI3 interface if the Payload buffering function 226 is activated. When the functionality is activated, at least some of the LI payload data is stored in one or more buffer disks 50.

According to some embodiments of the Invention, the transmission controller 215 is configured to transmit high priority classified LI payload data over a dedicated interface 230 to the LEA 800, if the Payload buffering function 226 is activated. Said Interface 230 is separate from the HI3 interface.

Moreover, the reserving of bandwidth usage for High priority LI data only has following beneficial results:

No variation of IP packet delay for real time flow, because if DF3 reserves the bandwidth for IP packets belonging to HIGH PRIORITY COMMUNICATIONS, each IP packet before being sent does not remain too long in delivery queues.

High Priority LI data are delivered to the LEA in a real time.

As illustrated in FIG. 3, the ADMF 118 may be provided with an alert entity 240. If the level of undelivered LI payload data in one or more delivery queues exceeds the first threshold value T1, then the temporary buffering function 224 is activated, and the comparator 214 is configured to signalling via the interface X1_3 to the alert entity 240, which is configured to alert the Law Enforcement Agency 800 by sending a warning notification message, i.e. warning message, for informing the LEA 800 that temporary buffering of LI payload data has started. Alternatively, the temporary buffering function 224 may signal via the interface X1_3 to the alert entity 240 to alert the Law Enforcement Agency 800 by sending a warning message.

If the level of undelivered LI payload data in one or more delivery queues exceeds the second threshold value T2, then the payload buffering function 226 is activated, and the comparator 214 of the monitoring means 210, or the payload buffering function 226 of the transmission controller 215, is configured to signalling via the Interface X1_3 to the alert entity 240, which is configured to alert the Law Enforcement Agency 800 by sending an alarm message for informing the LEA 800 that payload buffering of LI payload data has started.

Figure 5:
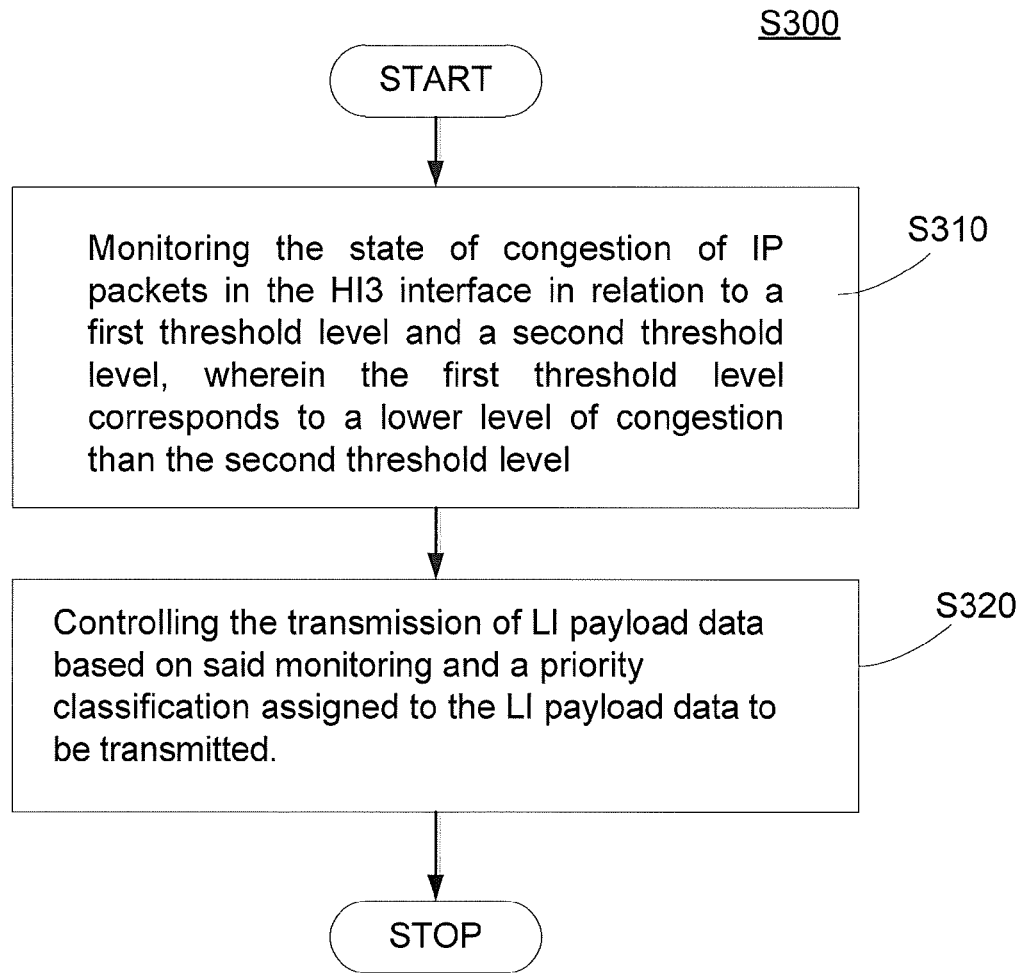
FIG. 5 is a flowchart illustrating one embodiment of a method according to one aspect of the present invention.

FIG. 5 is a flowchart illustrating one embodiment of a method S300 according to one aspect of the present invention. It is an embodiment of a method for maintaining a wanted Quality of Service transmission level of Lawful Interception, LI, payload data to a Law Enforcement Agency, LEA, via an HI3 interface in a LI system. The LI payload data is acquired from an intercepted Internet Protocol, IP, packet flow and belonging to one or more target identities using a specific Internet communications service. The method comprises following steps:

S310:—Monitoring the state of congestion of IP packets in the HI3 interface in relation to a first threshold level T1 and a second threshold level T2, wherein the first threshold level corresponds to a lower level of congestion than the second threshold level. The monitoring means 210 is configured to monitor the state of congestion of IP packets in the HI3 interface in relation to a first threshold level T1 and a second threshold level T2, wherein the first threshold level T1 corresponds to a lower level of congestion than the second threshold level T2. The state of congestion in the HI3 Interface is monitored by monitoring the current level of buffered IP packets in the buffers 30. The monitoring means 210 comprises a comparator 214 configured to compare a first threshold level T1 and a second threshold level T2 to the level of undelivered LI payload data in said one or more delivery queues 30.

S320:—Controlling the transmission of LI payload data based on said monitoring and a priority classification assigned to the LI payload data to be transmitted. The arrangement 114 comprises a transmission controller 215 configured to control the transmission of LI payload data to the LEA via the HI3 interface based on said monitoring and a priority classification assigned to the LI payload data to be transmitted.

The transmission controller 215 may comprise a transmit controller 222 which can reduce or increase the amount of LI payload data transmitted over the HI3 Interface. As an example, the transmit controller 222 may reduce the amount of LI payload data transmitted over the HI3 interface by limiting the transmission of LI payload data classified as low priority LI payload data, if the level of congestion exceeds the first threshold level T1 but not the second threshold T2. This example is Illustrated in the flowchart of FIG. 6.

Figure 6:
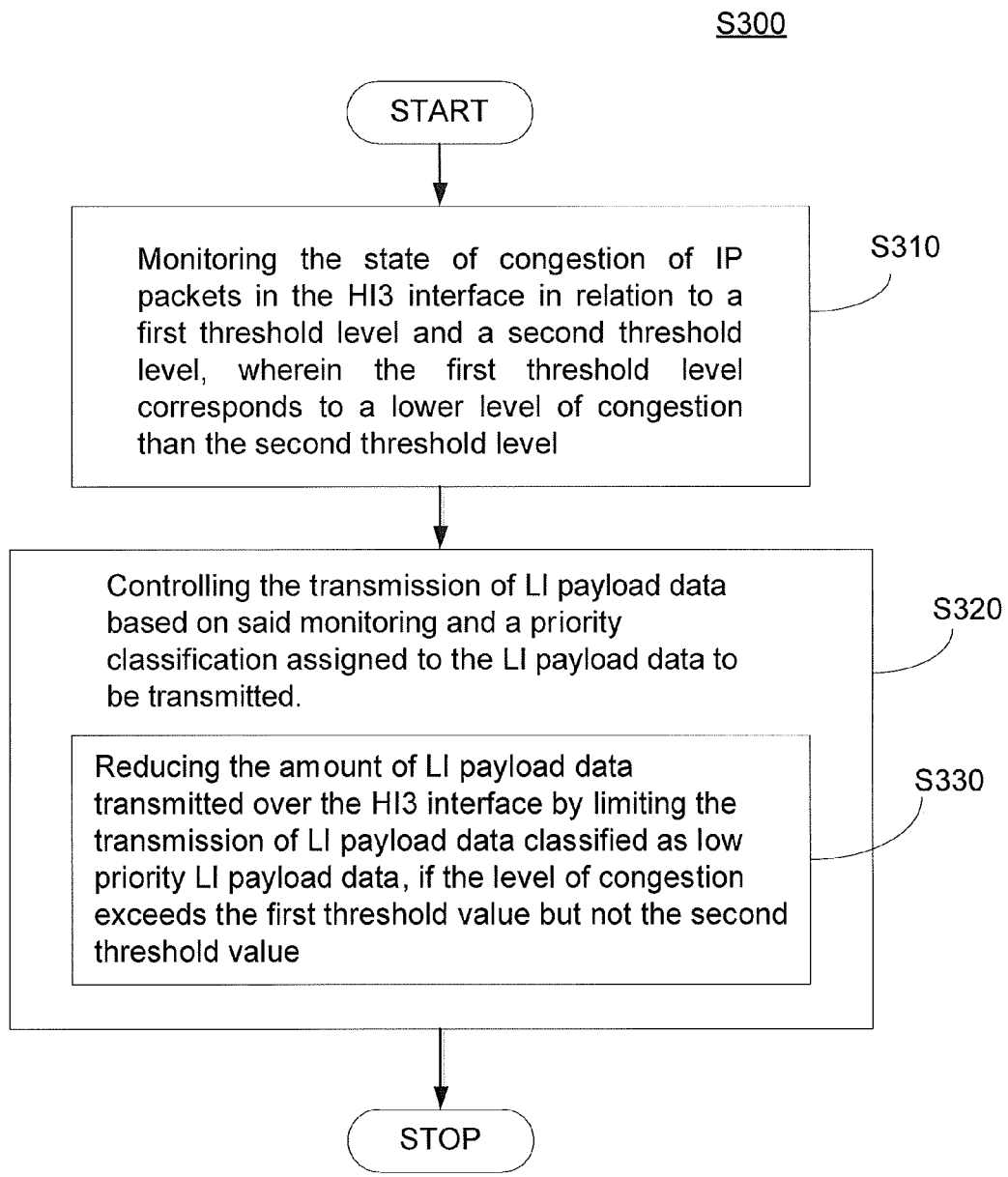
FIG. 6 is a flowchart illustrating further one embodiment of the method according to one aspect of the present invention.

FIG. 6 is a flowchart illustrating further one embodiment of the method S300 according to one aspect of the present invention. The method comprises following steps:

S310:—Monitoring the state of congestion of IP packets in the HI3 Interface in relation to a first threshold level T1 and a second threshold level T2, wherein the first threshold level T1 corresponds to a lower level of congestion than the second threshold level T2.

S320:—Controlling the transmission of LI payload data based on said monitoring and a priority classification assigned to the LI payload data to be transmitted. The step of controlling the transmission of LI payload data further involves:

S330:—Reducing the amount of LI payload data transmitted over the HI3 Interface by limiting the transmission of LI payload data classified as low priority LI payload data, if the level of congestion exceeds the first threshold level T1 but not the second threshold value T2. The transmission controller 215 is adapted to reduce by means of a transmit controller 222 the amount of LI payload data transmitted over the HI3 interface by limiting the transmission of LI payload data classified by means of a communication classifier 219 as low priority LI payload data, if the level of congestion exceeds the first threshold level T1 but not the second threshold level T2.

Figure 7:
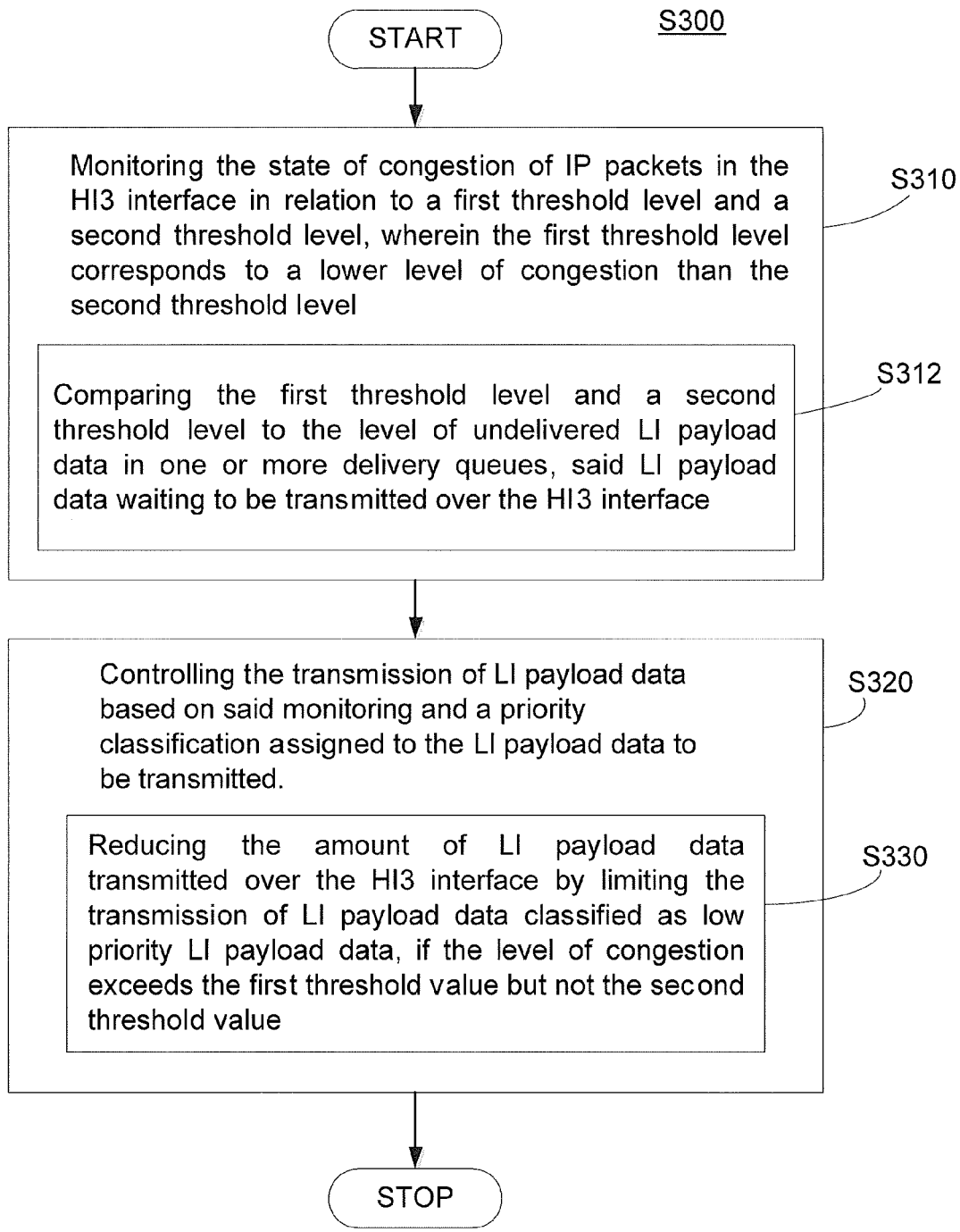
FIG. 7 is a flowchart illustrating one additional embodiment of the method according to the present invention.

Further one embodiment of the method S300 according to the present invention is illustrated in the flowchart of FIG. 7.

The embodiment comprises the steps S310 and S320 as described above, wherein the step of monitoring the state of congestion of IP packets in the HI3 interface, S310, involves:

S312:—Comparing the first threshold level T1 and a second threshold level T2 to the level of undelivered LI payload data in one or more delivery queues, said LI payload data waiting to be transmitted over the HI3 Interface. The monitoring means 210 comprises a comparator 214 configured to compare the first threshold level T1 and a second threshold level T2 to the level of undelivered LI payload data in said one or more delivery queues 30.

Figure 8:
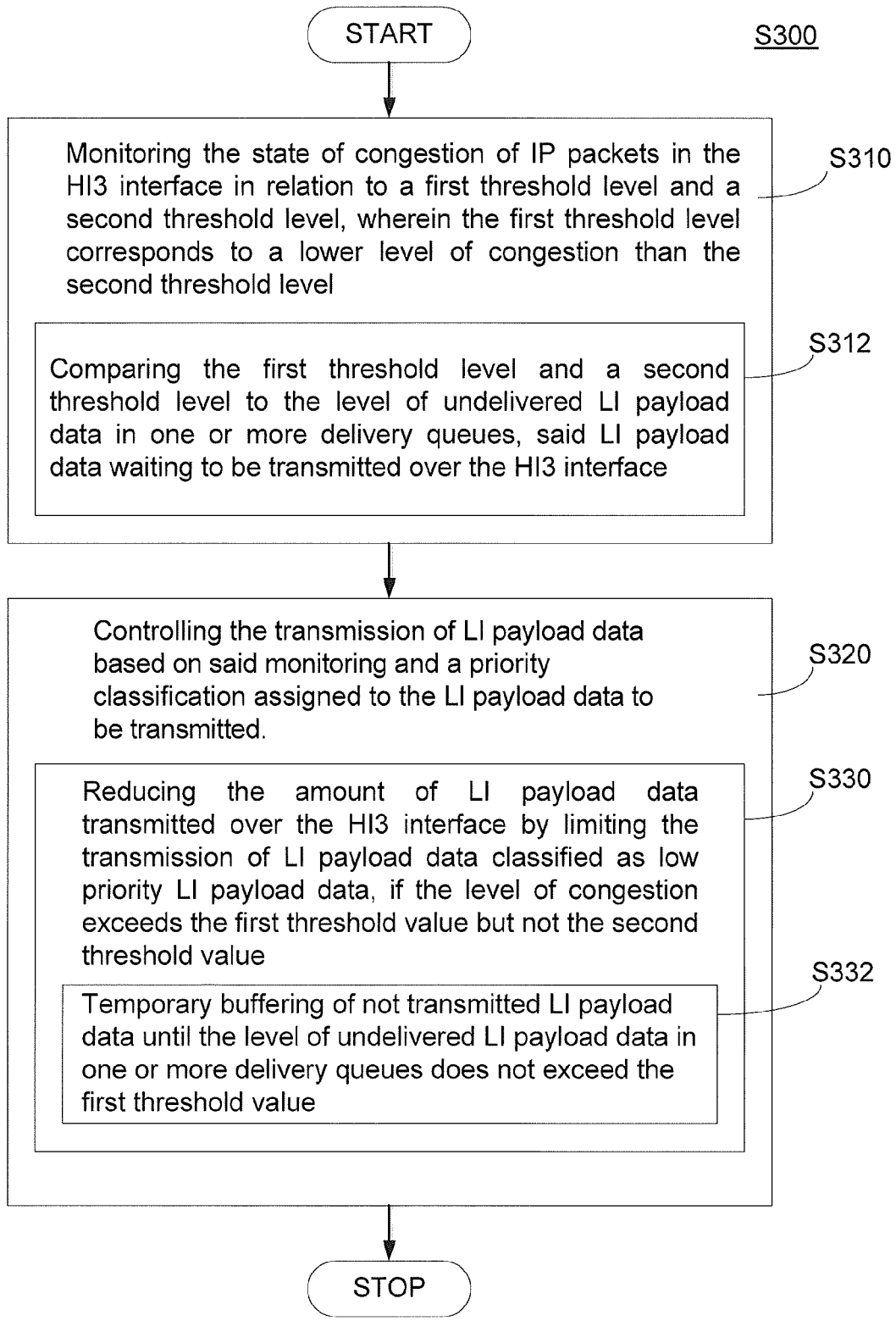
FIG. 8 is a flowchart illustrating yet another embodiment of the method according to the present invention.

FIG. 8 is a flowchart illustrating further one embodiment of the method S300. This embodiment comprises the steps S310 and S320 as described in the embodiments above, but the step S330 of reducing the amount of transmitted LI payload data Involves:

S332:—Temporary buffering of not transmitted LI payload data until the level of undelivered LI payload data in one or more delivery queues does not exceed the first threshold level T1. The transmission controller 215 comprises a temporary buffering controller 224 which is configured to activate temporary buffering of not transmitted LI payload data until the level of undelivered LI payload data in one or more delivery queues 30 does not exceed the first threshold level T1.

Figure 9:
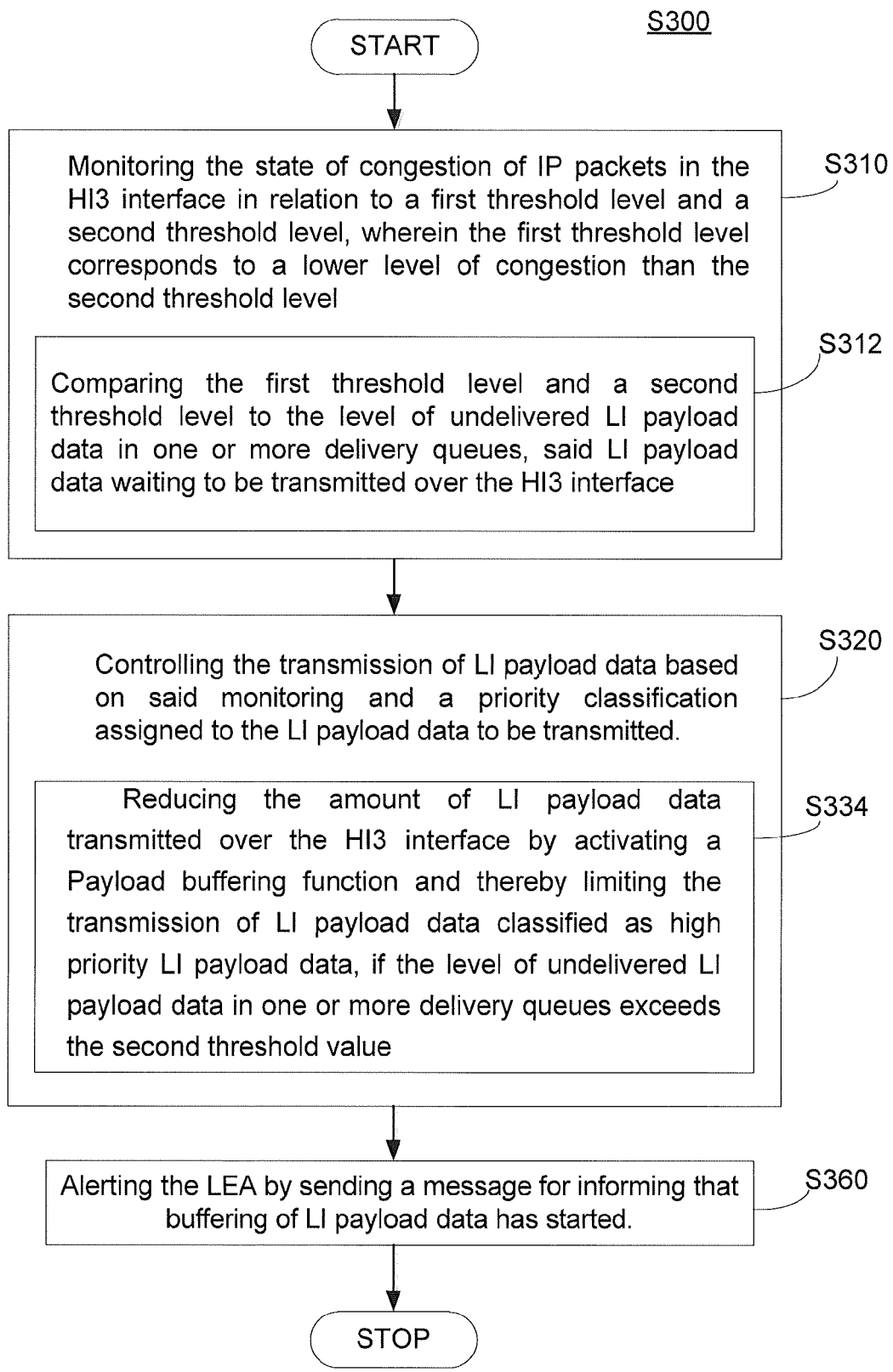
FIG. 9 is a flowchart illustrating further one embodiment of the method according to the present invention.

FIG. 9 is a flowchart illustrating further one embodiment of the method S300 according to the present invention. This embodiment comprises the steps S310 and S320 as described in the embodiments above, but the step of controlling S330 the transmission of LI payload data involves:

S334:—Reducing the amount of LI payload data transmitted over the HI3 interface by activating a Payload buffering function and thereby limiting the transmission of LI payload data classified as high priority LI payload data, if the level of undelivered LI payload data in one or more delivery queues exceeds the second threshold level T2. If the level of undelivered LI payload data in one or more delivery queues 30 exceeds the second threshold value T2, then the transmission controller 215 reduces by means of the transmit controller 222 the amount of LI payload data transmitted over the HI3 interface by activating a Payload buffering function 226 and thereby limiting the transmission of LI payload data, which is classified as high priority LI payload data by means of a communication classifier 219. The payload data is now buffered on the buffer discs 50.

This embodiment may also comprise following step:

S360:—Alerting the LEA by sending a message for informing that buffering of LI payload data has started. An ADMF alert entity 240 is configured to alert the Law Enforcement Agency 800 or a monitoring centre by sending a message for Informing that buffering of LI payload data has started. As illustrated in FIG. 3, the administration function, ADMF, 118 has been provided with an alert entity 240. If the level of undelivered LI payload data in one or more delivery queues exceeds the first threshold value T1, then the temporary buffering function is activated, and the comparator 214 is configured to signalling via the interface X1_3 to the alert entity 240, which is configured to alert the Law Enforcement Agency 800 by sending a warning message for informing the LEA 800 that temporary buffering of LI payload data has started.

If the level of undelivered LI payload data in one or more delivery queues exceeds the second threshold value T2, then the payload buffering function is activated, and the comparator 214 is configured to signalling via the interface X1_3 to the alert entity 240, which Is configured to alert the Law Enforcement Agency 800 by sending an alarm message for informing the LEA 800 that payload buffering of LI payload data has started.

Alternatively, instead of the comparator and the monitoring means, the transmission controller 215 may signal to the alert entity to send said warning or alarm messages to the LEA 800 or a monitoring centre, when the Payload buffering function 226 is activated.

Figure 10:
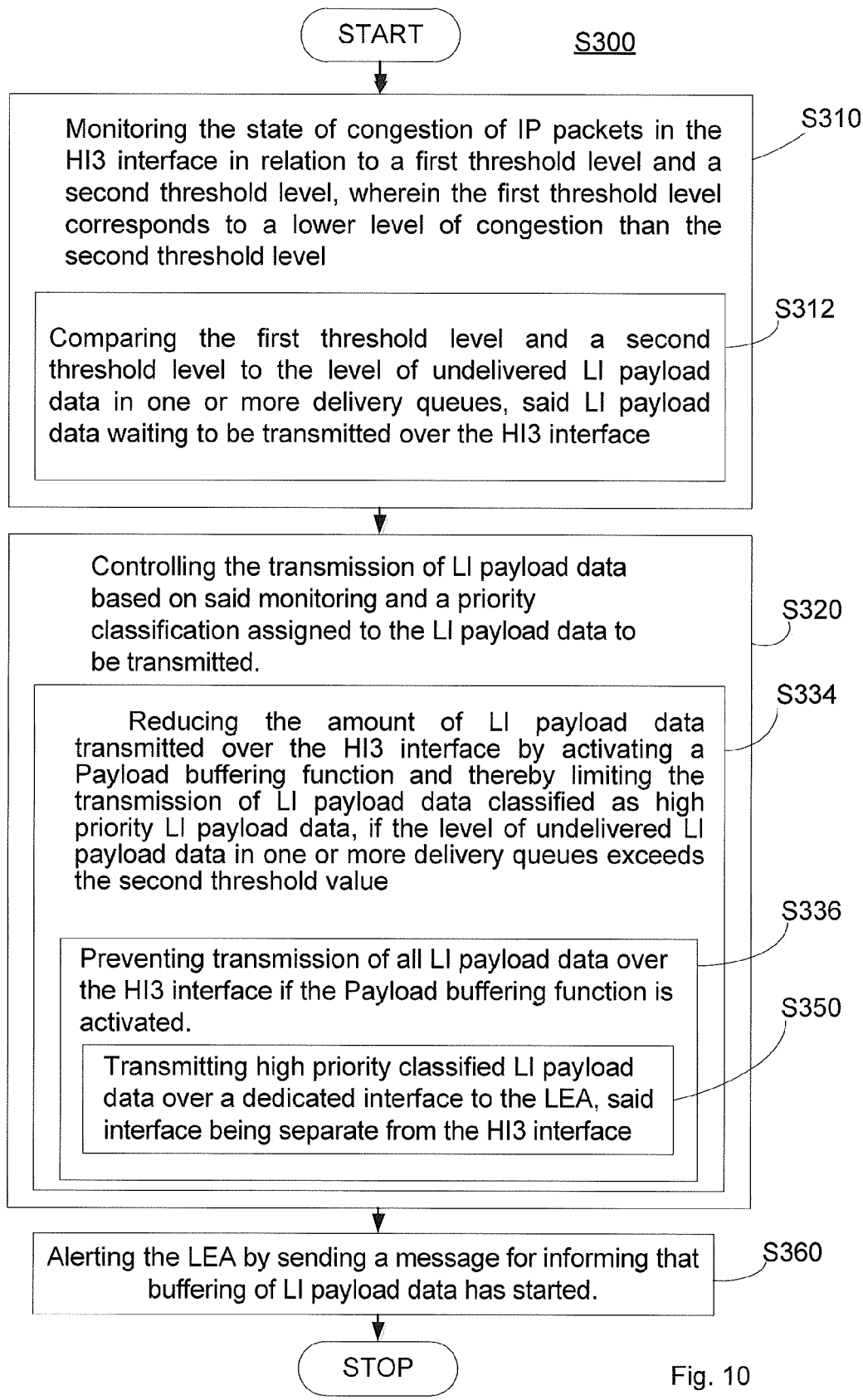
FIG. 10 is a flowchart illustrating further one embodiment of the method according to the present invention.

FIG. 10 is a flowchart illustrating further one embodiment of the method S300 according to the present Invention. This embodiment comprises the steps S310 and S320 as described in the embodiments above, but the step of reducing the amount of transmitted LI payload data Involves:

S336:—Preventing transmission of all LI payload data over the HI3 interface if the Payload buffering function is activated. The transmission controller 215 is adapted to prevent transmission of all LI payload data over the HI3 interface f the Payload buffering function 226 is activated. The DF3 block comprises may a transmitter or other sender device for transmitting payload data over the HI3 Interface. Said transmitter or sender device may be controlled by the transmit controller 222 in said transmission controller 215.

Step S336 may also Involve following step:

S350:—Transmitting high priority classified LI payload data over a dedicated interface to the LEA, said interface being separate from the HI3 Interface. If the Payload buffering function 226 is activated, the transmit controller 222 is configured to transmit high priority classified LI payload data over a dedicated interface 230 to the LEA 800, said interface 230 being separate from the HI3 interface. In this way, high priority payload data is transmitted to the LEA 800 or to a monitoring centre without being interrupted by buffering.

Figure 11:
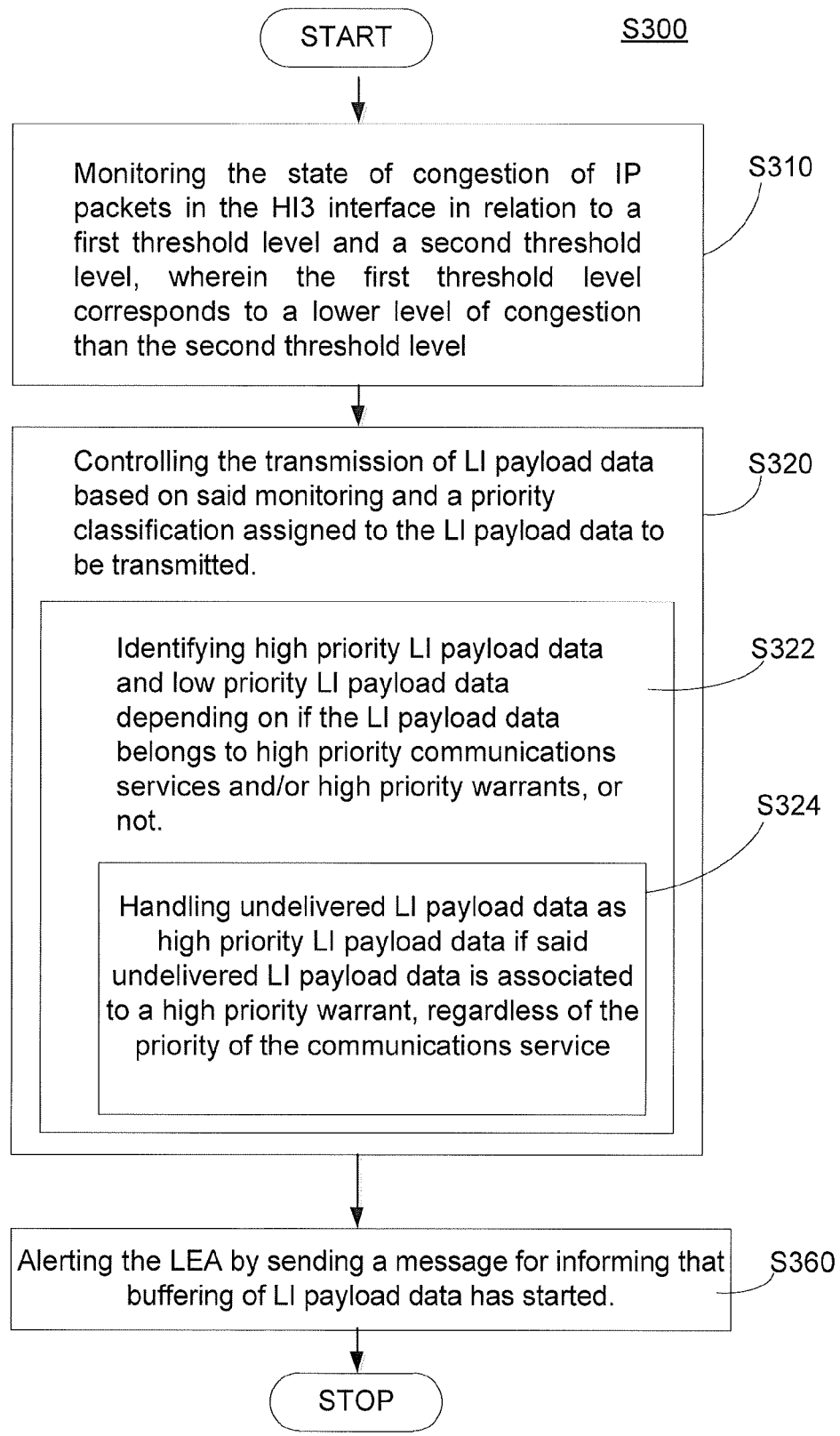
FIG. 11 is a flowchart Illustrating further one embodiment of the method according to the present invention.

FIG. 11 is a flowchart Illustrating further one embodiment of the method S300 of the present Invention. The embodiment is described with reference both to the flowchart in FIG. 11 and the block diagram in FIG. 12.

Figure 12:
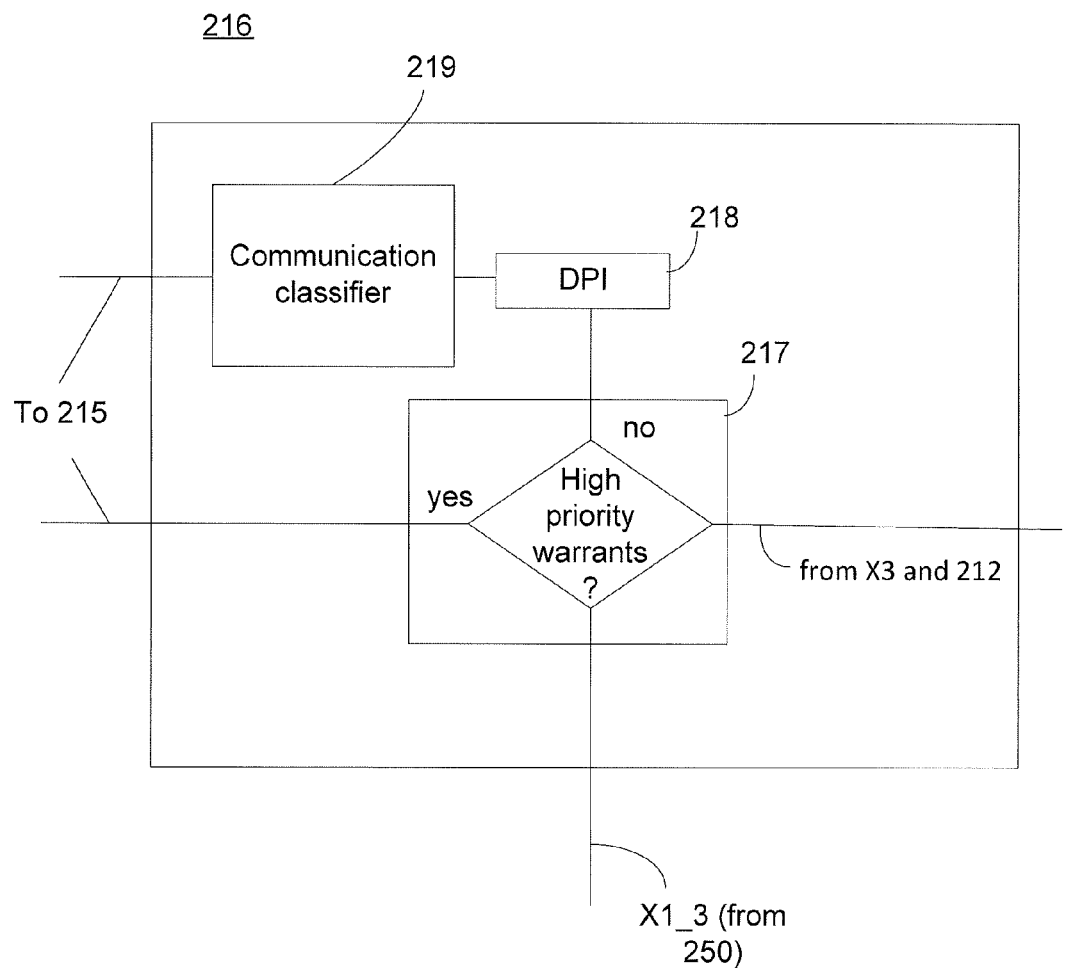
FIG. 12 is a block diagram of an IP packet classification functionality block in a delivery functionality lock DF3 of an arrangement according to the present Invention.

FIG. 12 is a block diagram of an IP packet classification functionality block in a delivery functionality lock DF3 126 of an arrangement 114 according to the present invention. The transmission controller 215 of the delivery functionality block DF3 126 comprises an IP packet classification functionality block 216, which is activated when the comparator 214 indicates that the first threshold level T1 is reached. Block 216 is deactivated when the level of packets in buffer 30 is lower than T1. Said block 216 provides the transmission controller 215 with the necessary Information, e.g. classification Information, which information is used for handling the undelivered LI payload data, CC, properly and for controlling the transmission of LI payload data based on said monitoring and a priority classification assigned to the LI payload data to be transmitted.

The IP packet classification functionality block 216 involves a warrant classifier means 217 configured to identify high priority LI payload data and low priority LI payload data depending on if the LI payload data is associated to high priority warrants, or not The warrant classifier means 217 receives warrant Information from the warrant priority setting functionality means 250 in the ADMF 118 (see FIG. 3) via the Interface X1_3. Said delivery functionality block DF3 comprises also a deep packet inspection DPI unit 218 that enables the communications classifier 219 to determine which kind of communication service that the received IP packets are related to. The deep packet inspection DPI unit 218 reads the header content of the received IP packets. The header content of the received IP packets may be read by the means for checking data packets 212 in the monitoring means 212 (see FIG. 4). The communications classifier 219 is configured to identify high priority LI payload data and low priority LI payload data depending on if the LI payload data belongs to high priority communications services, or not. The classifier 219 may use a list or table, see Table 1 above, wherein each service related to a priority class, e.g. high or low.

Thus, when the comparator 214 indicates that the first threshold level T1 is reached, the IP packet classification functionality block 216 is activated and the embodiment of method 9300, which is Illustrated in the flowchart of FIG. 11, may be executed. This embodiment may comprise the steps S310 and S320 with sub-steps as described in the embodiments above—all said sub-steps are not Illustrated in the flowchart in FIG. 11—and the step of:

S322:—Identifying high priority LI payload data and low priority LI payload data depending on if the LI payload data belongs to high priority communications services and/or high priority warrants, or not. The warrant classifier 217 is activated when the comparator 214 indicates that the first threshold level T1 is reached and the temporary buffering function control 224 is activated. If said received and undelivered LI payload data is associated to a high priority warrant, step S324 is performed. If the LI payload data belongs to a low priority warrant, the DPI 218 and the communications classifier 219 is activated. If the IP packets of a certain LI payload data belong to a low priority communications service, determined by means of a classification list as exemplified above, the IP packets are sent to the temporary buffer block, i.e. the low priority queue buffer 32, for temporary storage until the level of packets in the buffer 30 is below T1, when it is sent to the LEA or monitoring centre. If the IP packets of a certain LI payload data belong to a high priority communications service, the IP packets are sent to the LEA or monitoring centre without any buffering and delay. If the Payload buffering function 226 is activated, the transmit controller 222 is configured to transmit high priority classified LI payload data over a dedicated interface 230 to the LEA 800, said Interface 230 being separate from the HI3 Interface. In this way, high priority payload data is transmitted to the LEA 800 or to a monitoring centre without being interrupted by buffering.

S324:—Handling undelivered LI payload data as high priority LI payload data if said undelivered LI payload data is associated to a high priority warrant, regardless of the priority of the communications service. Handling undelivered LI payload data as high priority LI payload data means that the IP packets of said LI payload data are sent to the LEA or monitoring centre and not stored and delayed in any temporary buffer storage 32. If the Payload buffering function 226 is activated, the transmit controller 222 is configured to transmit high priority classified LI payload data over a dedicated interface 230 to the LEA 800, said interface 230 being separate from the HI3 interface. In this way, high priority payload data is transmitted to the LEA 800 or to a monitoring centre without being interrupted by buffering.

For better understanding of the embodiments and aspects of the present Invention, a number of operation examples of the embodiments of the arrangement and method taught above are described with reference to FIGS. 13-15. Said examples are Included for purposes of improved understanding and should therefore not be interpreted as limitations of the invention.

Figure 2:
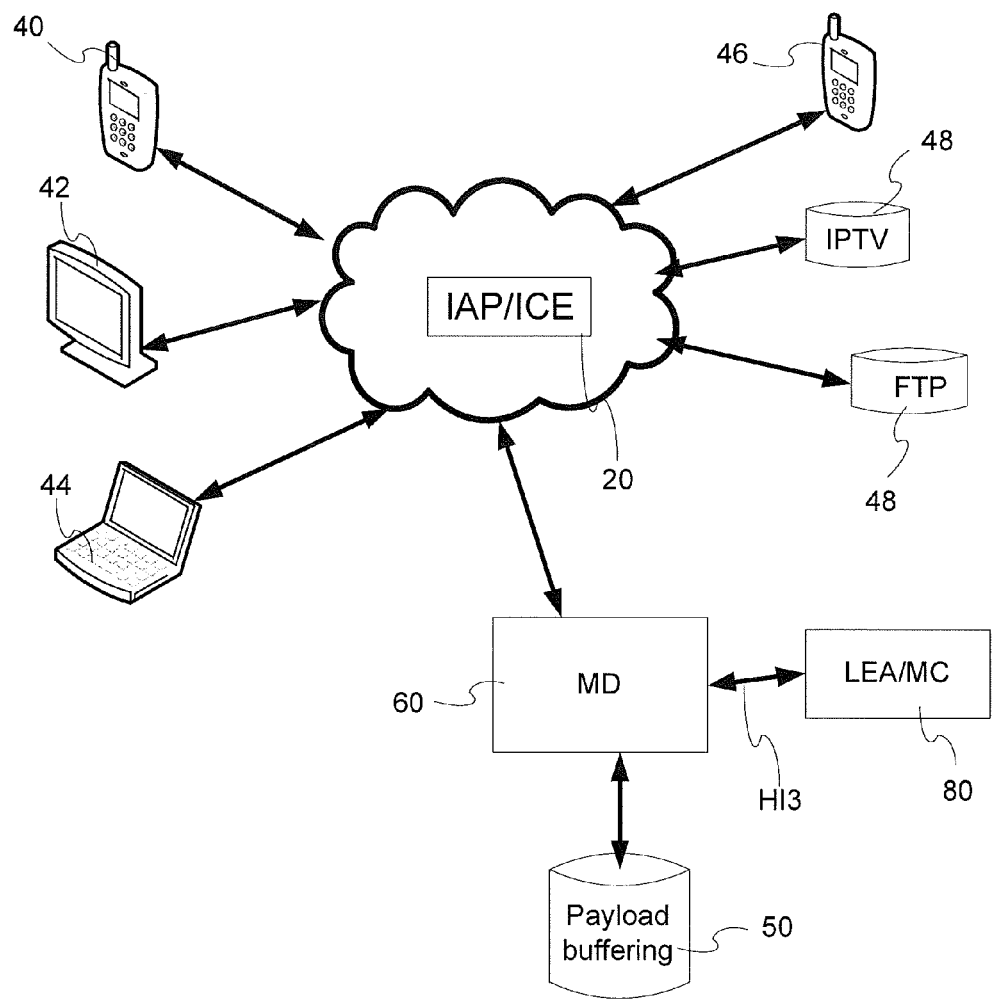
FIG. 2 is a block diagram illustrating schematically a Lawful Interception, LI, system and network.
Figure 13:
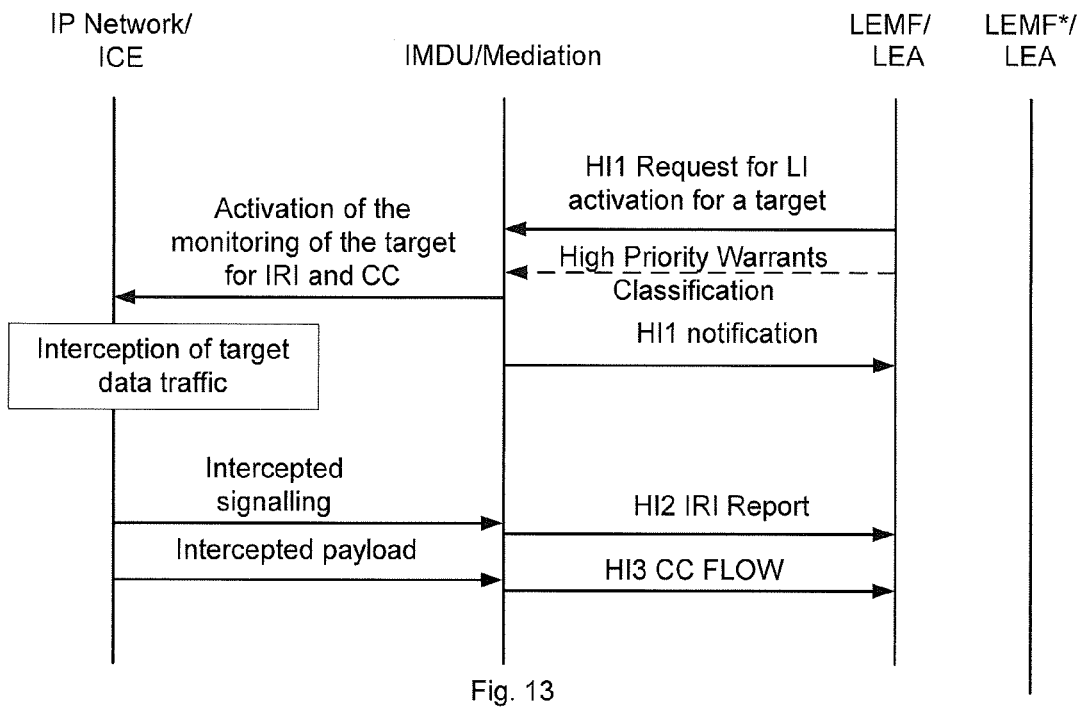
FIG. 13 is a message flow chart illustrating an example of a flow of data information in the system and network arrangement according to the present invention when the level of buffered data is lower than T1.

FIG. 13 is a message flow chart illustrating embodiments of the flow of data information in the system and network arrangement which is configured to be activated in dependence of a warrant regarding target data traffic, e.g. when a target, such as a person, under monitoring uses a communication service as illustrated in FIG. 2. For achieving the described purpose, any embodiment of the described system and network arrangement 100 a Lawful Interception, LI, system comprising an ICE 20, as illustrated in FIG. 3, may be used. Therefore, in the description hereafter, reference is also made to FIGS. 2 and 3.

A user, e.g. an investigator of a Law Enforcement Agency, LEA, 800 uses the Law Enforcement Management Function, LEMF, 12 to send a request for Intercepting Internet IP data packet communications traffic, i.e. a request for Lawful Interception (LI) activation, through the ICE 20. The request specifies one or more targets as one or more target identities. Further, the request may specify if the warrant should be set to high or low priority. The LI system therefore is provided with a warrant priority setting functionality means 250 in the LEA. Said means 250 provide a user of the system the possibility to set a priority of a warrant, e.g. high or low. A request is marked with the selected priority, which is configured to communicate with a warrant priority marking means 260 in the ADMF 118. Said marking means 260 is designed to mark the warrant with a high or low priority label. A warrant is marked with the sent priority. When the marking means 260 receives a request, it is configured to read the priority in the request for the corresponding warrant to be generated. Warrants are sent over the interface X1_3.

The intercept request is sent through the first Handover Interface, HI1, located between the LEMF 12 and the Intercept Mediation and Delivery Unit, IMDU, 114 comprising the Administration Function unit, ADMF, 118. Thus, the request involves a request to get the signaling traffic and intercepted payload of the IP data traffic associated with the target identity currently under inspection.

The ADMF 118 is configured to generate and send warrants upon receipt of requests. Said warrants are used for activation and automatic triggering of LI when one or more targets use a communication service generating IP data communication through the Interception Access point comprising the ICE 20 via the Interface X1_1. An HI1 notification message may be generated as a confirmation of the generation of a warrant. Said message is returned to the LEMF/LEA via the HI2 link.

The ICE 20 is configured to receive the warrant, which is an activation of the monitoring of the target for generating an Intercept Related Information (IRI) report and a Contents of Communication report, or a CC flow, comprising the intercepted payload of the IP data packets. The ICE 20 may comprise a controller comprising a processor unit, which is configured to intercept the data traffic through the node IAP using said one or more target Identities. The ICE are triggered by the warrant to tap, or collect, i.e. Intercept and filter the data traffic for data IP data packets sent between the servers and the mobile communication device.

The ICE 20 is configured to generate an IRI report, comprising information regarding the traffic signaling of the target, which was identified in said warrant. The ICE 20 is also configured to deliver the IRI report to the Delivery Function 2, DF2, 22 of the IMDU 114 via the interface X2.

The ICE 20 is further configured to generate a Contents of Communication report, here also denoted CC flow, comprising the intercepted payload of the IP data packets of the target, which was identified in said warrant. The ICE 20 is also configured to deliver the CC flow to the Delivery Function 3, DF3, 126 of the IMDU 114 via the Interface X3.

The IMDU 114 comprises the Delivery Function for IRI reporting, DF2, 22 and a Mediation Function of IRI, MF2, 24. The MF2/DF2 converts the received traffic signaling into the required format a standardized IRI report based on the received IRI report, which comprises Information related to said one or more target identities defined in the warrant. Said standardized IRI report is sent over a standardized interface HI2 to the LEMF 12.

The IMDU 114 comprises the Delivery Function for CC reporting, DF3, 126 and a Mediation Function of CC, MF3, 28. The MF3/DF3 converts the received payload data Into the required format a standardized CC report based on the received CC flow, which comprises information related to said one or more target identities defined in the warrant. Said standardized CC flow is sent over a standardized interface HI3 to the LEMF 12.

The LEMF 12 may comprise a Collection Functionality, which is adapted to receive the standardized IRI and CC reports with the Intercepted data information related to said one or more target identities. Said information is provided to the requesting LEA 800.

The delivery functionality block DF3 126 comprises the monitoring means 210 configured to monitor the state of congestion of IP packets in the HI3 interface in relation to a first threshold level T1 and a second threshold level T2, wherein the first threshold level T1 corresponds to a lower level of congestion than the second threshold level T2. The arrangement 114 comprises a transmission controller 215 configured to control the transmission of LI payload data to the LEA via the HI3 Interface based on said monitoring and a priority classification assigned to the LI payload data to be transmitted.

As Illustrated in FIG. 4, the delivery functionality block DF3 126 comprises one or more delivery queues 30 for queuing undelivered LI payload data. The monitoring means 210 comprises a comparator 214 configured to compare the first threshold level T1 and a second threshold level T2 to the level of undelivered LI payload data in said one or more delivery queues 30. Said level of undelivered LI payload data in said one or more delivery queues 30 is used as a measure of the state of congestion of IP packets in the HI3 interface.

Figure 14:
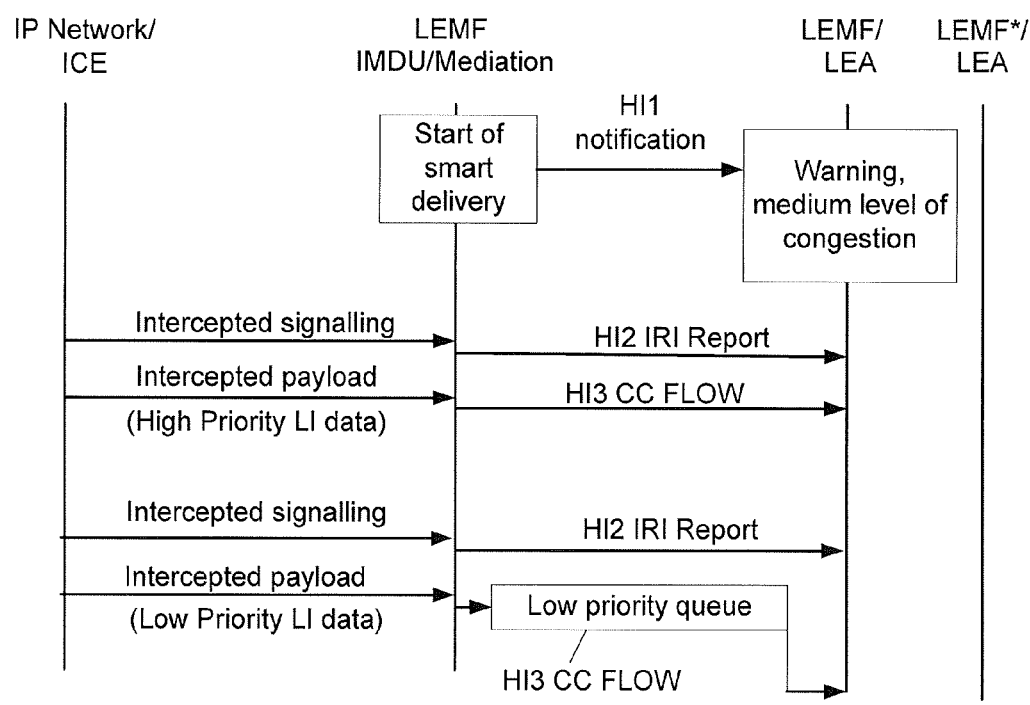
FIG. 14 is a message flow chart illustrating an example of a flow of data information in the system and network arrangement according to the present Invention when the level of buffered data exceeds T1, but is lower than T2.

FIG. 14 is a message flow chart illustrating embodiments of the flow of data Information in the system and network arrangement when the first threshold level T1 is exceeded.

When the level of IP packets in the delivery queues 30 exceeds the first threshold level T1, the monitoring means 210 alerts the transmission controller 215 and the LEMF and the LEA. The transmission controller 215 starts the smart delivery functionality, even denoted smart delivery mode or smart delivery operation.

In the smart delivery mode, the monitoring means 214 or the transmission controller 215 may be configured to send an HI1 notification message to the LEMF/LEA, which upon reception of said message indicates a "medium level of congestion"-warming to a user/investigator. An alert entity 240 of the ADMF 118 generates and sends said the warning message. The transmission controller 215 is configured to reduce the amount of LI payload data transmitted over the HI3 interface by limiting the transmission of LI payload data classified as low priority LI payload data, if the level of congestion exceeds the first threshold value T1 but not the second threshold value T2. The transmission of payload data classified as high priority LI payload data is not reduced or affected.

As illustrated in the message flow chart of FIG. 14, high priority LI payload data is transmitted to the LEMF/LEA while low priority LI data is directed to a temporary buffering in the low priority queue buffer 32 of the delivery functionality block DF3 126, see FIG. 4. The temporary buffered data is delivered to the LEMF/LEA when the level of IP payload data packets in the buffering queue block 30 has decreased and is lower than T1. The delivery functionality block control 200, and thereby the LI system, returns to normal mode and normal operation.

However, if the level of IP payload data packets in the buffering queue block 30 increases and exceeds the second threshold level T2, the delivery functionality block control 200 changes from the smart delivery mode to the payload buffering mode, i.e. payload buffering operation.

Figure 15:
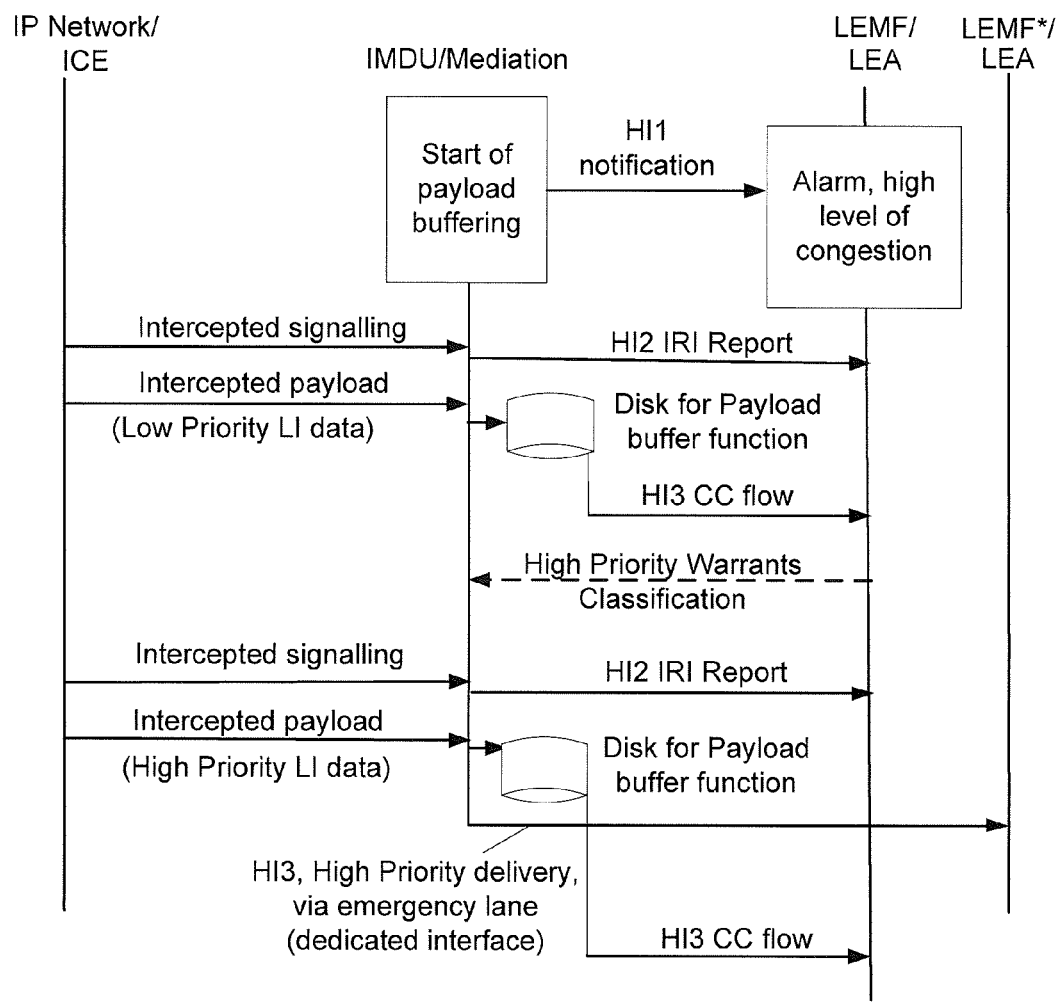
FIG. 15 is a message flow chart illustrating an example of a flow of data information in the system and network arrangement according to the present invention when the level of buffered data exceeds T2.

FIG. 15 is a message flow chart illustrating embodiments of the flow of data information in the system and network arrangement when the second threshold level T2 is exceeded.

When the second threshold level T2 is exceeded, the monitoring means 210 alerts the transmission controller 215 to switch to payload buffering mode. The transmission controller 215 may be configured to send an HI1 notification message to the LEMF/LEA, which upon reception of said message indicates a "high level of congestion"-alarm to a user/investigator, which is alerted. The alert entity 240 of the ADMF 118 is configured to generate and send said the alarm message. If the level of congestion exceeds the second threshold value, the monitoring means 210 or the transmission controller 215 is configured to reduce the HI3 CC flow, i.e. the amount of LI payload data, transmitted over the HI3 interface by limiting the transmission of LI payload data regardless priority classification of the LI payload data.

The transmission controller 215 reduces by means of a transmit controller 222 the HI3 CC flow transmitted over the HI3 interface by activating a Payload buffering function 226 and thereby limiting the transmission of LI payload data. The transmission controller 215 may be adapted to prevent transmission of all LI payload data over the HI3 Interface if the Payload buffering function 226 is activated. When the functionality is activated, at least some of the LI payload data is stored in one or more buffer disks 50. The HI2 IRI reports are not stored in the Payload buffering mode. Said reports are sent on regular basis to the LEMF and LEA.

According to some embodiments of the Invention, the transmission controller 215 is configured to transmit high priority classified LI payload data over a dedicated interface 230 to the LEA 800, either via the regular LEMF or via a another specific LEMF*, if the Payload buffering function 226 is activated. Said interface 230 is separate from the HI3 Interface.

The High Priority LI data are extracted and delivered to the LEA 800 via the defined emergency route 230. The remaining LI data, preferably, Low Priority LI data are normally buffered according to the underlying Payload Buffering function.

Upon proper request over HI1 from the agency to send LI data related to specific High Priority warrants, the LI management system comprises such LI data among the ones already Identified as belonging to the High Priority communication or to the High Priority warrants set at creation time and then delivers all them via the alternative route, i.e. dedicated interface 230.

As benefit, the "Snowball effect issue#3"-problem, resulting in possible loss of data, is minimized. Once the link is recovered part of the LI data—the most relevant one—has been already delivered to the agency. This will result in minimizing the amount of buffered LI data to be sent to the agency while the real time intercepted data are simultaneously arriving from the nodes.

Moreover, High priority LI data are available to the agency sooner, since it is not needed to wait for the delivery of the whole buffer.

The above descried embodiments of the different aspects of the invention provide a number of advantages over known prior art. Operators can provide an automatic solution for handling situation where connectivity issues prevent the real time delivery and the agency claims the immediate delivery of urgent LI data. It avoids ad hoc, unsecure, unplanned, operations like manual delivery to the agency via e-mail, manual delivery via DVD, memory devices which is usually requested to the operator in such cases.

It reduces conditions of network congestion on delivery side by reducing the amount of data to deliver when the congestion in network increases. This mechanism delays the triggering of the "Payload Buffering" by limiting its activation only to situations of permanent high traffic conditions on incoming side of DF3.

When in the network there is a little congestion and the "Payload Buffer" function is not yet active, it manages the bandwidth in a rational manner by reserving the bandwidth only for High priority LI data and this mechanism minimize the variation of IP packet delay for real time flows avoiding the jitter.

It minimizes the snowball effect with possible loss of data: once the link is recovered, buffered LI data shall be sent to the agency while the real time intercepted data are simultaneously arriving from the nodes. Since loss of intercepted data is always an issue involving the operator, by reducing such risk shall be seen as a benefit for the operator.

LEA benefits from the ability to receive urgent LI data in near-real-time without waiting the restore of connectivity, which could take long time and make useless the relevance of important intercepted information.

LEA benefits from the ability to receive real time data flow without the presence of jitter.

LEA benefits from the reduced risk of the snowball effect described above with reduced risk to lose LI data.

A number of embodiments of the present Invention have been described. It will be understood that various modifications may be made without departing from the scope of the Invention. Therefore, other Implementations are within the scope of the following claims defining the invention.

REFERENCES

[1] 3GPP TS 33.106 "Lawful Interception requirements (Release 8)";
[2] 3GPP TS 33.107 "Lawful interception architecture and functions (Release 8)";
[3] 3GPP TS 33.108 "Handover Interface for Lawful Interception" (Release 8)

The invention claimed is:

1. A method for maintaining a wanted Quality of Service transmission level of Lawful Interception (LI) payload data to a Law Enforcement Agency (LEA) via an HI3 interface in a LI system, the LI payload data acquired from an intercepted Internet Protocol (IP) packet flow and belonging to one or more target identities using a specific Internet communications service, the method comprises:
Receiving, at a mediation device, the LI payload data from an intercepting control element over an X3 interface between the intercepting control element and the mediation device,
wherein the mediation device is configured to receive the LI payload data from the intercepting control element for transmission to the LEA;
Monitoring a state of congestion of IP packets in the HI3 interface between the mediation device and the LEA in relation to a first threshold level T1 and a second threshold level T2, wherein the first threshold level T1 corresponds to a lower level of congestion than the second threshold level T2; and
Controlling the transmission of LI payload data over the HI3 interface between the mediation device and the LEA based on said monitoring and a priority classification assigned to the LI payload data to be transmitted,
wherein monitoring the state of congestion of IP packets in the HI3 interface between the mediation device and the LEA comprises comparing the first threshold level T1 and the second threshold level T2 to a level of undelivered LI payload data in one or more delivery queues on the mediation device, said undelivered LI payload data waiting to be transmitted over the HI3 interface between the mediation device and the LEA after having been received from the intercepting control element over the X3 interface.

2. The method according to claim 1, wherein the step of controlling the transmission of LI payload data comprises:
Reducing an amount of LI payload data transmitted over the HI3 interface by limiting the transmission of LI payload data classified as low priority LI payload data, based on the level of congestion exceeding the first threshold level T1 but not the second threshold level T2.

3. The method according to claim 2, wherein the step of reducing the amount of transmitted LI payload data comprises:
Temporarily buffering undelivered LI payload data in a low priority queue buffer separate from the one or more delivery queues on the mediation device until the level of undelivered LI payload data in one or more delivery queues does not exceed the first threshold level T1; and
Responsive to the level of undelivered LI payload data in the one or more delivery queues no longer exceeding the first threshold level T1, transmitting undelivered LI payload data from the low priority queue over the HI3 interface to the LEA.

4. The method according to claim 3, wherein the step of controlling the transmission of LI payload data comprises:
Reducing the amount of LI payload data transmitted over the HI3 interface by activating a Payload buffering function on the mediation device to store LI payload data in a disk buffer separate from the low priority queue buffer and the one or more delivery queues, and thereby limiting the transmission of LI payload data classified as high priority LI payload data, based on the level of undelivered LI payload data in one or more delivery queues exceeding the second threshold value.

5. The method according to claim 4, wherein the step of reducing the amount of transmitted LI payload data comprises:
Preventing transmission of all LI payload data over the HI3 interface if the Payload buffering function is activated.

6. The method according to claim 5, wherein the step of preventing transmission of all LI payload data over the HI3 interface comprises:
Transmitting high priority classified LI payload data that is received over the X3 interface from the intercepting control element out over a dedicated interface to the LEA, said interface being separate from the HI3 interface.

7. The method according to claim 4, further comprising:
Identifying high priority LI payload data and low priority LI payload data depending on if the LI payload data belongs to high priority communications services and/or high priority warrants, or not.

8. The method according to claim 7, wherein the identifying step comprises:
Handling undelivered LI payload data as high priority LI payload data based on said undelivered LI payload data being associated to a high priority warrant, regardless of the priority of the communications service.

9. The method according to claim 4, further comprising:
prior to receiving the LI payload data from the intercepting control element, receiving, at the mediation device, a warrant comprising a warrant priority and a request to intercept transmissions associated with the one or more target identities;
determining, at the mediation device, the warrant priority of the warrant; and
classifying LI payload data as high priority LI payload data responsive to determining that the LI payload data belongs to intercepted transmissions associated with a warrant having a high warrant priority.

10. The method according to claim 3, further comprising:
Alerting the LEA by sending a message for informing that buffering of LI payload data has started.

11. A mediation device for maintaining a wanted Quality of Service transmission level of Lawful Interception (LI) payload data to a Law Enforcement Agency (LEA) via an HI3 interface of a LI system, the LI payload data acquired from an intercepted Internet Protocol (IP) packet flow and belonging to one or more target identities using a specific Internet service, which comprises:
a Receiving circuit configured to receive the LI payload data from an intercepting control element over an X3 interface between the intercepting control element and the mediation device,
wherein the mediation device is configured to receive the LI payload data from the intercepting control element for transmission to the LEA;
a Monitoring circuit configured to monitor a state of congestion of IP packets in the HI3 interface between the mediation device and the LEA in relation to a first threshold level T1 and a second threshold level T2, wherein the first threshold level T1 corresponds to a lower level of congestion than the second threshold level T2; and
a Transmission Controller configured to control the transmission of LI payload data to the LEA via the HI3 interface between the mediation device and the LEA based on said monitoring and a priority classification assigned to the LI payload data to be transmitted, wherein the mediation device comprises one or more delivery queues for queuing undelivered LI payload data, and the monitoring circuit comprises a comparator configured to compare the first threshold level T1 and the second threshold level T2 to a level of undelivered LI payload data in said one or more delivery queues on the mediation device, said undelivered LI payload data waiting to be transmitted over the HI3 interface between the mediation device and the LEA after having been received from the intercepting control element over the X3 interface.

12. The mediation device according to claim 11, wherein the Transmission Controller is adapted to reduce an amount of LI payload data transmitted over the HI3 interface by limiting the transmission of LI payload data classified as low priority LI payload data, based on the level of congestion exceeding the first threshold level T1 but not the second threshold level T2.

13. The mediation device according to claim 12, wherein the Transmission Controller is configured to:
   activate temporary buffering undelivered LI payload data in a low priority queue buffer separate from the one or more delivery queues on the mediation device until the level of undelivered LI payload data in one or more delivery queues does not exceed the first threshold level T1; and
   Responsive to the level of undelivered LI payload data in the one or more delivery queues no longer exceeding the first threshold level T1, transmit undelivered LI payload data from the low priority queue over the HI3 interface to the LEA.

14. The mediation device according to claim 13, wherein the Transmission Controller is configured to reduce the amount of LI payload data transmitted over the HI3 interface by activating a Payload buffering function on the mediation device to store LI payload data in a disk buffer separate from the low priority queue buffer and the one or more delivery queues, and thereby limiting the transmission of LI payload data classified as high priority LI payload data, based on the level of undelivered LI payload data in one or more delivery queues exceeding the second threshold level T2.

15. The mediation device according to claim 14, wherein the Transmission Controller is adapted to prevent transmission of all LI payload data over the HI3 interface if the Payload buffering function is activated.

16. The mediation device according to claim 15, wherein the Transmission Controller is configured to transmit high priority classified LI payload data that is received over the X3 interface from the intercepting control element out over a dedicated interface to the LEA, said interface being separate from the HI3 interface, if the Payload buffering function is activated.

17. The mediation device according to claim 14, wherein the Receiving circuit is further configured to receive, prior to receiving the LI payload data from the intercepting control element, a warrant comprising a warrant priority and a request to intercept transmissions associated with the one or more target identities, and
   wherein the mediation device further comprises a warrant classifier circuit configured to:
      determine the warrant priority of the warrant; and
      classify LI payload data as high priority LI payload data responsive to determining that the LI payload data belongs to intercepted transmissions associated with a warrant having a high warrant priority.

18. The mediation device according claim 13, wherein an ADMF alert entity is configured to alert the Law Enforcement Agency by sending a message for informing that buffering of LI payload data has started.

19. The mediation device according to claim 13, further comprising:
   a warrant classifier circuit configured to identify high priority LI payload data and low priority LI payload data depending on if the LI payload data is associated to high priority warrants, or not;
   a communications classifier configured to identify high priority LI payload data and low priority LI payload data depending on if the LI payload data belongs to high priority communications services, or not.

20. The mediation device according to claim 19, wherein the warrant classifier circuit is adapted to handle and identify undelivered LI payload data as high priority LI payload data if said undelivered LI payload data is associated to a high priority warrant, regardless of the priority of the communications service.

* * * * *